US012316603B2

United States Patent
Qadri et al.

(10) Patent No.: US 12,316,603 B2
(45) Date of Patent: May 27, 2025

(54) REMOTE COMMAND ACCESS IN A HYBRID CLOUD TO ON-PREMISES DEVICES

(71) Applicant: Microsoft Technology Licensing, LLC, Redmond, WA (US)

(72) Inventors: Faraz H. Qadri, Redmond, WA (US); Aniket A. Malatpure, Redmond, WA (US); Swapnil T. Ashtekar, Redmond, WA (US); Greeshma Vijayakumar, Issaquah, WA (US); Shireen Anvarhusein Isab, San Francisco, CA (US); Mohit Kumar Garg, Sunnyvale, CA (US); Phani Prakash Boppana, Santa Clara, CA (US); Trivikram Somisetty, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 393 days.

(21) Appl. No.: 17/566,351

(22) Filed: Dec. 30, 2021

(65) Prior Publication Data

US 2023/0109755 A1 Apr. 13, 2023

Related U.S. Application Data

(60) Provisional application No. 63/253,854, filed on Oct. 8, 2021.

(51) Int. Cl.
*H04L 9/40* (2022.01)
(52) U.S. Cl.
CPC .............. *H04L 63/02* (2013.01); *H04L 63/10* (2013.01)
(58) Field of Classification Search
CPC ..... H04L 63/02; H04L 63/10; H04L 63/0281; H04L 63/0428
See application file for complete search history.

(56) References Cited

U.S. PATENT DOCUMENTS 11,533,190 B2 * 12/2022 Ansari .................... H04L 49/25
11,637,828 B2 * 4/2023 Totale ................... H04L 63/102
726/5

(Continued)

FOREIGN PATENT DOCUMENTS

EP 2832125 A2 2/2015

OTHER PUBLICATIONS

"Authorization Rules and Security Features of Windows PowerShell Web Access", Retrieved from: https://docs.microsoft.com/en-us/previous-versions/windows/it-pro/windows-server-2012-r2-and-2012/dn282394(v=ws.11), Aug. 31, 2016, 14 Pages.

(Continued)

*Primary Examiner* — Carl G Colin
*Assistant Examiner* — Andrew Suh
(74) *Attorney, Agent, or Firm* — Newport IP, LLC; Jacob P. Rohwer

(57) ABSTRACT

Systems and methods for remote command access in a hybrid cloud to on-premises devices are described. An example method includes receiving, by a gateway service, a request for a connection between a remote support service agent and an on-premises device. The method further includes receiving, by the gateway service, consent from an authorized user associated with the on-premises device. The method further includes creating, by the gateway service, a first session with the on-premises device, where a scope of the consent is limited to the first session. The method further includes provisioning, by the gateway service, a device-specific hybrid connection endpoint for the first session. The method further includes forming, by the gateway service a secure session by binding the device-specific hybrid connection endpoint with a second session, the secure session allowing for transport of data and a set of commands based on a scope of the consent.

20 Claims, 14 Drawing Sheets

(56) References Cited

U.S. PATENT DOCUMENTS

| | | | |
|---|---|---|---|
| 11,671,457 B2* | 6/2023 | Yeh | H04L 63/0281 726/23 |
| 11,689,522 B2* | 6/2023 | Kulkarni | H04L 63/0823 709/205 |
| 11,757,860 B1* | 9/2023 | Cole | H04L 63/08 705/7.15 |
| 2016/0028688 A1* | 1/2016 | Chizhov | H04W 12/06 726/12 |
| 2016/0308876 A1 | 10/2016 | Smith et al. | |
| 2018/0191471 A1* | 7/2018 | Elhaddad | H04L 1/24 |
| 2018/0213020 A1 | 7/2018 | Kakutani et al. | |
| 2020/0366582 A1* | 11/2020 | Bharatkumar | G06F 11/3006 |
| 2021/0234677 A1* | 7/2021 | Isenhour | H04L 63/0861 |
| 2021/0306325 A1* | 9/2021 | Olden | H04L 63/0815 |
| 2021/0342049 A1* | 11/2021 | Singh | G06F 9/452 |
| 2023/0103518 A1* | 4/2023 | Rogers | G06F 21/53 726/26 |

OTHER PUBLICATIONS

"HPE Nimble Storage", Retrieved from: https://www.hpe.com/us/en/storage/nimble.html?pp=false&jumpid=ps_csqvu4pi6h_aid-510455007&gclid=CjwKCAiAlvnfBRA1EiwAVOEgfH9FYddj2PIGxPv_gxhC-xkwFfwWH7K7-yjmwjEWZ2mtVNmPPEidyBoCbF4QAvD_BwE&gclsrc=aw.ds, Retrieved Date: Sep. 6, 2021, 13 Pages.

"JSON-RPC 2.0 Specification", Retrieved From: http://www.jsonrpc.org/specification, Mar. 26, 2010, 7 Pages.

"Maintain Infrastructure with Zero Downtime", Retrieved from: https://www.youtube.com/watch?v=6B9d3JXXAHg, May 17, 2017, 4 Pages.

"NetApp Blog, the vanguard of data innovations", Retrieved from: https://www.netapp.com/blog/#t=Blogs&sort=%40publish_date_mktg%20descending&layout=card&f:@facet_language_mktg=[English], Jan. 10, 2022, 8 Pages.

"Nutanix Insights: Simplifying IT Support Operations", Retrieved from:https://www.nutanix.com/viewer?type=pdf&path=/content/dam/nutanix/resources/solution-briefs/sb-insights.pdf, Retrieved Date: Sep. 6, 2021, 2 Pages.

"Proactive Blog", Retrieved from: https://www.proactivesolutions.com/blog/topic/hybrid-cloud, Retrieved Date: Sep. 6, 2021, 6 pages.

"State of the Hybrid Cloud 2017", Retrieved from: http://info.microsoft.com/rs/157-GQE-382/images/EN-CNTNT-Report-StateoftheHybridCloud2017Report.PDF, 2017, pp. 1-19.

"Use the Web-based Windows PowerShell Console", Retrieved from: https://docs.microsoft.com/en-us/previous-versions/windows/it-pro/windows-server-2012-R2-and-2012/hh831417(v=ws.11)#:~:text=%20Use%20the%20Web-based%20Windows%20PowerShell%20Console%20,and%20timing%20out.%20Any%20of%20the . . . %20More%20, Aug. 31, 2016, 12 pages.

"VMware Skyline", Retrieved from: https://web.archive.org/web/20220112221148/https://www.vmware.com/support/services/skyline.html, Jan. 12, 2022, 4 Pages.

"VMware Skyline: Proactive Support", Retrieved from: https://www.youtube.com/watch?v=6QRWxjA8JFw&t=37s, Aug. 28, 2017, 4 Pages.

Gerend, et al., "Group Managed Service Accounts Overview", Retrieved from: https://docs.microsoft.com/en-us/windows-server/security/group-managed-service-accounts/group-managed-service-accounts-, overview#:~:text=The%20group%20Managed%20Service%20Account%20%28gMSA%29%20provides%20the,but%20also%20extends%20that%20functionality%20over%20multiple%20servers., Jul. 29, 2021, 5 Pages.

Pelluru, et al., "What is Azure Relay?", Retrieved from: https://docs.microsoft.com/en-us/azure/azure-relay/relay-what-is-it#hybrid-connections, Oct. 6, 2021, 7 Pages.

"VMware Skyline Advisor Pro Customer Spotlight: David Frankfort", Retrieved from: https://www.youtube.com/watch?v=w0cqJD2pq_o, Dec. 17, 2021, 3 Pages.

"Nutanix Core—Die Basics zur Nutanix HCI Infrastruktur", Retrieved from: https://www.youtube.com/watch?v=BtvhnaJc0-E, May 4, 2020, 3 Pages.

Pelluru, et al., "Azure Relay Hybrid Connections protocol", Retrieved from: https://docs.microsoft.com/en-us/azure/azure-relay/relay-hybrid-connections-protocol, Jul. 24, 2021, 19 Pages.

"International Search Report and Written Opinion Issued in PCT Application No. PCT/US22/038255", Mailed Date: Oct. 18, 2022, 16 Pages.

* cited by examiner

REMOTE COMMAND ACCESS IN A HYBRID CLOUD TO ON-PREMISES DEVICES

CROSS-REFERENCE TO A RELATED APPLICATION

This application claims the benefit of U.S. Provisional Application No. 63/253,854, filed Oct. 8, 2021, titled "IMPLEMENTING RESILIENT AND INTERACTIVE COMMAND ACCESS IN A HYBRID CLOUD TO ON-PREMISES DEVICES OVER UNRELIABLE NETWORKS," the entire contents of which are hereby incorporated herein by reference.

BACKGROUND

Increasingly, computing, storage, and network resources are accessed via the public cloud, private cloud, or a hybrid of the two. The public cloud includes a global network of servers that perform a variety of functions, including storing and managing data, running applications, and delivering content or services, such as streaming videos, electronic mail, office productivity software, or social media. The servers and other components may be located in data centers across the world. While the public cloud offers services to the public over the Internet, businesses may use private clouds or hybrid clouds. Both private and hybrid clouds also include a network of servers housed in data centers. Cloud service providers offer access to these resources by offering cloud computing and storage resources to customers.

At times, users may want to access not only the cloud resources offered by a cloud service provider, but also access devices that are located on-premises and are not part of the resources offered by the cloud service provider. There is a need for methods and systems to address access issues in such hybrid cloud environments.

SUMMARY

In one aspect, the present disclosure relates to a method including receiving, by a gateway service, a request for a connection between a remote support service agent and an on-premises device. The method further includes receiving, by the gateway service, consent from an authorized user associated with the on-premises device. The method further includes creating, by the gateway service, a first session with the on-premises device, where a scope of the consent is limited to the first session.

The method further includes provisioning, by the gateway service, a device-specific hybrid connection endpoint for the first session. The method further includes forming, by the gateway service a secure session by binding the device-specific hybrid connection endpoint with a second session, the secure session allowing for transport of data and a set of commands based on a scope of the consent.

In another aspect, the present disclosure relates to a gateway service for enabling remote access to an on-premises device. The gateway service may comprise instructions that, when executed by a processing system, perform operations including receive a request for a connection between a remote support service agent and the on-premises device requiring support, receive consent from an authorized user associated with the on-premises device, and create a first session with the on-premises device, where a scope of the consent is limited to the first session.

The operations further include provision a device-specific hybrid connection endpoint for the first session and form a secure session by binding the device-specific hybrid connection endpoint with a second session and ensuring a one to one mapping between the first session and the second session, the secure session allowing for transport of data and a set of commands based on the scope of the consent.

In yet another aspect, the present disclosure relates to a method including receiving, by a gateway service, a request for a connection between a remote support service agent and an on-premises device, where the remote support service agent does not have permission to create direct inbound connections to the on-premises device. The method further includes receiving, by the gateway service, consent from an authorized user associated with the on-premises device and creating, by the gateway service, a first session with the on-premises device based at least on the consent, where a scope of the consent is limited to the first session.

The method further includes provisioning, by the gateway service, a device-specific hybrid connection endpoint for the first session and forming, by the gateway service, a secure session by binding the device-specific hybrid connection endpoint with a second session and ensuring a one to one mapping between the first session and the second session, the secure session allowing for transport of data and a set of commands based on a scope of the consent.

BRIEF DESCRIPTION OF THE DRAWINGS

The present disclosure is illustrated byway of example and is not limited by the accompanying figures, in which like references indicate similar elements. Elements in the figures are illustrated for simplicity and clarity and have not necessarily been drawn to scale.

DETAILED DESCRIPTION

Figure 1:
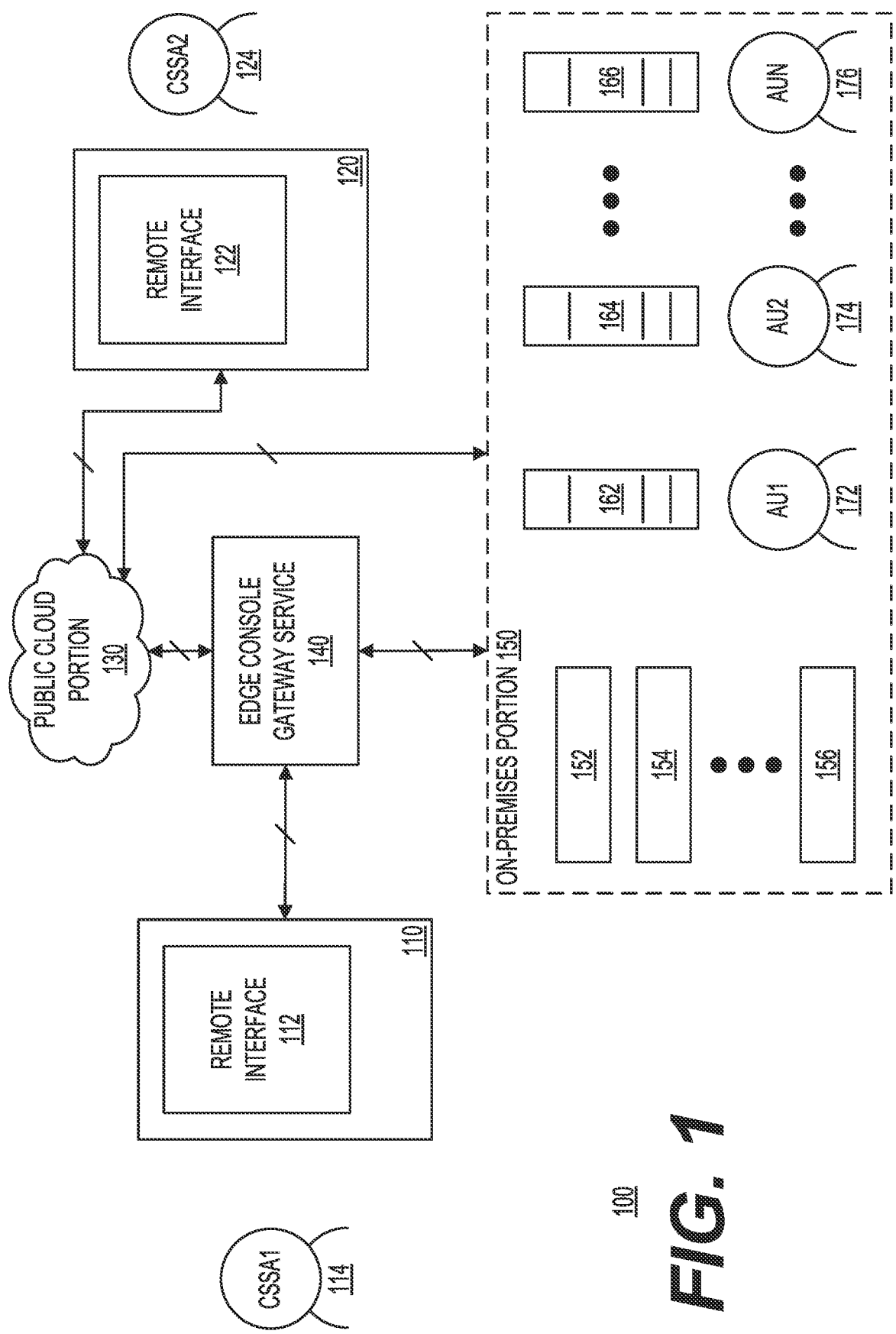
FIG. 1 shows a system environment for implementing a resilient and interactive command access to on-premises devices in a hybrid cloud.

Examples described in this disclosure relate to methods and systems for enabling access to (e.g., provide support services for) on-premises devices via a gateway service associated with a cloud service provider. A significant proportion of users of cloud providers deploy hybrid cloud solutions (e.g., Azure Stack Hub, Edge, and HCI). Such hybrid cloud solutions include access to both resources provided via the data centers of the cloud provider and resources that are deployed by the users on their premises. Moreover, the users' hybrid cloud solutions may host business critical applications. Such users prefer to not have disruptions caused by software or hardware issues related to the on-premises devices. They expect an efficient resolution of such issues through the support services provided by the cloud provider or a third party. Efficient resolution can often be facilitated by enabling the hybrid cloud provider with limited remote access to these devices for diagnostic and remediation purposes.

Any remote access to the on-premises devices needs to contend with several issues that arise because of the hybrid nature of the cloud deployment. Such issues may be categorized broadly as: (1) network-related issues, (2) access-related issues, and (3) security-related issues. Network-related issues may include firewall-based denial of inbound internet connections to the on-premises devices. This is because the firewall may allow the on-premises devices to initiate outbound connections but not inbound connections from the Internet. Network related issues may also relate to the unreliable (e.g., sometimes slow) internet connections to the on-premises devices located at the edge of the cloud.

Access-related issues may relate to restrictions on access placed by the user with respect to the on-premises devices and legal constraints imposed by agreement or law. Security-related issues may concern the presence of hypertext transport protocols (HTTPs) transport layer security (TLS) inspection filters that may result in the disclosure of, or worse tampering with the remotely accessed content.

Currently, interactive remote connections enable an authorized user to access a service (e.g., a PowerShell, or Windows Admin Center (WAC)) on an edge device for performing support related operations. Example differences in accessing these services remotely when compared to on site access relate to both authentication and network set up. Solutions like PowerShell Web require a valid user account with respect to the on-premises devices, which the Power-Shell may use for authentication. In case of edge scenarios, remote users, referred to herein as "remote agents" for clarity (e.g., support service agents), accessing a user device may not have a valid user account on the device, thus, integrated windows authentication cannot be used. Enabling a service to be accessed remotely (e.g., PowerShell Web, or WAC) involves a special networking setup that can range from opening firewall ports for inbound internet access, configuring DNS, or even deploying public IP. This is, however, not feasible in many scenarios due to the network and the security considerations.

Advantageously, certain aspects of the disclosure enable the provision of access (e.g., for remote support services) in a way that addresses these issues. The present disclosure describes implementing command access to on-premises devices. Such access is resilient and interactive, even over unreliable networks. In summary, a remote agent (e.g., a support service agent) is provided access to a user's on-premises device via a connectivity platform. Remote agents (e.g., support service agents) using this connectivity platform authenticate with the support service, but do not have authentication credentials to the user's on-premises device. The remote agent (e.g., a support service agent) is granted just in time (JIT) limited access to the on-premises device with detailed auditing on operations being performed as part of a session between the support service and the on-premises device. The connectivity platform allows data flow between remote agent and the on-premises device by ensuring both parties are properly authenticated while ensuring end to end session integrity and network resiliency. The examples described herein enforce session lifecycle with respect to when they are created or terminated based on several factors. In addition, the set of commands that can be performed on the on-premises device are restricted by the agent that establishes a remote session with the connectivity platform, and a detailed transcript of all operations that took place on the device is provided.

FIG. 1 shows an example of a system environment 100 for implementing a resilient and interactive command access to on-premises devices in a hybrid cloud. System environment 100 includes a hybrid cloud including a public cloud portion 130 and an on-premises portion 150. In this example, public cloud portion 130 may include computing, storage, and networking resources that are shared among multiple customers. In one example, public cloud portion 130 includes one or more data centers including storage, computing, and networking resources made available to multiple customers, or tenants by a cloud service provider.

With continued reference to FIG. 1, in one example, on-premises portion 150 includes computing, storage, and networking resources that are for use by a single customer or a small number of customers. As used herein, the term "on-premises portion" includes any portion of computing, storage, and network resources for use by a single customer or a small number of customers, including any other authorized users, such as contractors or third parties authorized by such customer(s). Examples of on-premises portion 150 include enterprise networks/devices, edge-compute/storage/networking resources, internet-of-things (IoT) networks/devices, 5G or 6G compute/storage/networking resources, or the like. As used herein, the term "on-premises devices" includes any devices that are deployed as part of on-premises portion 150. Any of the computing, storage, and networking resources included as part of on-premises portion 150 may be made accessible to authorized users via on-premises devices, such as severs (e.g., servers 152, 154, and 156 of FIG. 1), hosts, virtual machines, or other compute entities, and workstations (e.g., workstations 162, 164, and 166) deployed as part of on-premises portion 150. In terms of the operation of the cloud, the compute/storage/network resources may be provisioned via a resource provider (RP) service. Authorized users may access such computing, storage, and networking resources included as part of on-premises portion 150 via the Internet or local area networks (e.g., intranets that are limited for use by an enterprise).

Any of these on-premises devices may develop issues requiring support. System environment 100 may include mechanisms to create, maintain, restrict, and teardown a remote session to an on-premises devices from the cloud or another device during a support incident. As an example, as shown in FIG. 1, Edge Console Gateway Service (ECGS) 140 provides such mechanisms allowing remote support service agents (e.g., CSSA1 114 and CSSA2 124) to interact with any devices in on-premises portion 150. In one example, a support service agent (e.g., CSSA1 114) interacts with a device requiring support via a remote interface 112 (e.g., a command shell) presented via a terminal 110 (e.g., a browser-based terminal). Terminal 110 may be connected via the Internet to ECGS 140. In another example, a support service agent (e.g., CSSA2 124) interacts with a device requiring support via a remote interface 122 (e.g., a command shell) presented via a terminal 120 (e.g., a browser-based terminal). Terminal 120 may be connected to public cloud portion 130 via the Internet or other types of networks, and public cloud portion 130 may be connected to ECGS 140 via the Internet or other types of networks. Any of the support service agents may interact with the authorized users (e.g., authorized user AU1 172, authorized user AU2 174, and authorized user AUN 176) that have access to devices included in on-premises portion 150. Unlike the support service agents, such authorized users may have credentials (e.g., login, passwords, or other such credentials) allowing them on-going access to resources associated with on-premises portion 150 and even public cloud portion 130. The support service agents, however, may be provided JIT access lasting only for a duration of the remote session, or for a longer duration, depending upon the session setup. Although FIG. 1 shows system environment 100 including certain terminals, devices, and services arranged in a certain manner, ECGS 140 may be deployed in other system environments as well. In addition, the interactions among the various terminals, devices, and services may be accomplished using other components arranged in a similar manner or arranged differently.

Figure 2:
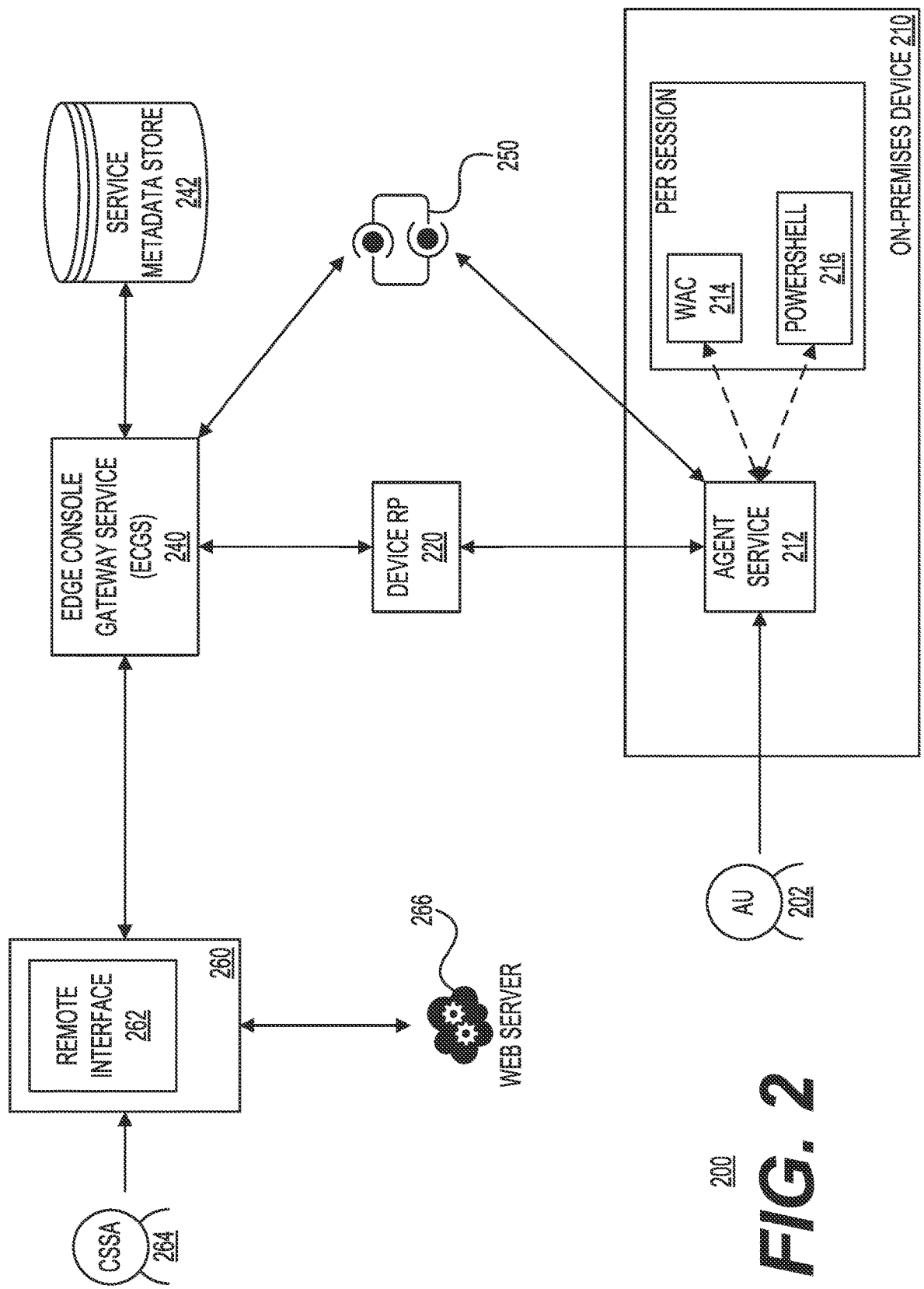
FIG. 2 shows a system for provisioning a remote support service in accordance with one example.

FIG. 2 shows an example system 200 for provisioning remote access (e.g., for a remote support service) in accordance with one example. System 200 is described in the context of system environment 100 of FIG. 1. System 200 may include an on-premises device 210 (similar to the on-premises devices described above with respect to FIG. 1), a relay service 250, an edge connection gateway service (ECGS) 240 (similar to ECGS 140 of FIG. 1), and a terminal 260 (similar to terminal(s) 110 and/or 120 of FIG. 1). Relay service 250 may support device specific hybrid connections. In one example, such hybrid connections use hypertext transport protocol (HTTP) and web sockets. In one example, the request to the gateway service (e.g., ECGS 240) can be through a device RP 220 service, which may use a gateway plugin to invoke the gateway service (e.g., as described below with respect to arrangement 1 (AR1) of FIG. 3). Alternatively, in another example, the request to the gateway service can be direct (e.g., as described below with respect to arrangement 2 (AR2) of FIG. 3). In terms of the operation of a relay service, a listening client may send a listening request to a relay service (e.g., relay service 250) via a gateway, which in turn may create a relay. A sending client may send a request to connect to a listening service offered by the relay. The gateway may send a request to the listening client to create a channel to a suitable gateway node that is appropriate for the sending client. The listening client may create a temporary channel to the gateway allowing the gateway to forward any messages from the listening client to the sending client and forward any messages from the sending client to the listening client.

With continued reference to FIG. 2, the process flow may proceed in the manner shown in Table 1 below:

TABLE 1

| | | | |
|---|---|---|---|
| 1. | Grant Customer Consent | | An authorized user (e.g., AU 202) associated with a customer grants consent for diagnostics or repair to a device (e.g., on-premises device 210). |
| 2. | Request a Device Specific Hybrid Connection | | In response to the consent, an agent service (e.g., agent service 212 running on on-premises device 210) sends a request to a gateway service (e.g., ECGS 240) for a device specific hybrid connection. In one example, such a device specific hybrid connection is arranged via a relay service (e.g., relay service 250). Moreover, such a hybrid connection may be authenticated using a shared access signature authentication (e.g., SAS authentication). As an example, SAS authentication includes the configuration of a cryptographic key with associated rights to a resource. Next, this key is used to generate a signature token that can be used to authenticate the request. In addition, in one example, the request to the gateway service can be through a device RP 220 service, which may use a gateway plugin to invoke the gateway service (e.g., AR1 of FIG. 3). Alternatively, in another example, the request to the gateway service can be direct (e.g., AR2 of FIG. 3). |
| 3. | Provision a Hybrid Connection Endpoint Resource | | A gateway service (e.g., ECGS 240 (similar to ECGS 140 of FIG. 1)) checks whether on-premises device 210 is registered by looking it up in a database (e.g., service metadata store 242) and also validates the authenticity of the request. After a successful authentication (e.g., SAS authentication), the gateway service (e.g., ECGS 240) provisions a unique device-specific hybrid connection endpoint resource and returns the corresponding shared access signature (SAS) to an agent service (e.g., agent service 212) associated with the on-premises device (e.g., on-premises device 210). |
| 4. | Set Up a Device Session | a. | An agent service (e.g., agent service 212) that is associated with the on-premises device (e.g., on-premises device 210) uses the received SAS to connect to the provisioned device-specific hybrid connection endpoint. |
| | | b. | A gateway service (e.g., ECGS 240) finds an active listener associated with the device-specific hybrid connection. |

TABLE 1-continued

| | | |
|---|---|---|
| | c. | The gateway service (e.g., ECGS 240) binds a user session initiated by the support service agent (e.g., CSSA 264) to a device session. A user session corresponds to a user (e.g., a remote agent), who has requested access to the on-premises device. This binding allows communication to occur between the support service agent's remote interface (e.g., a browser presented via terminal 260) and the on-premises device. In one example, as part of a user session, the remote agent uses the authorized user context (e.g., the Domain Administrator in Windows) to execute commands on the on-premises device. |
| 5 | Set Up a User Session | A gateway service (e.g., ECGS 240) provisions a user session allowing the support service agent (e.g., CSSA 264) to create a secure and JIT connection, via a remote interface 260 (e.g., a browser-based command shell (e.g., WAC 214 or PowerShell 216)), with the provisioned device-specific hybrid connection endpoint resource. |

Figure 3:
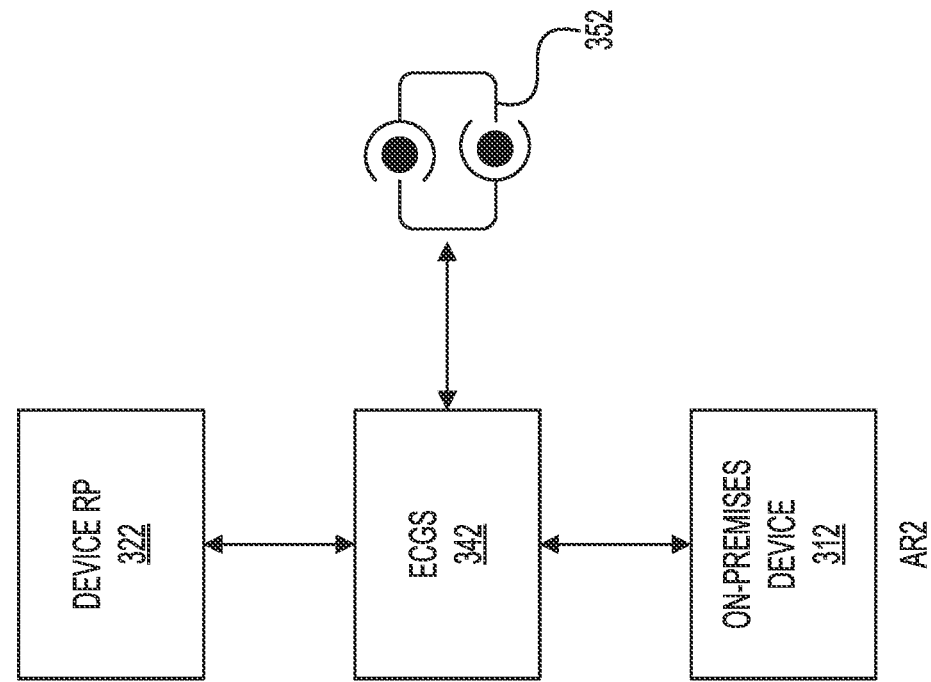
FIG. 3 shows two different arrangements for the provisioning of the device-specific hybrid connection endpoint resource.
Figure 3:
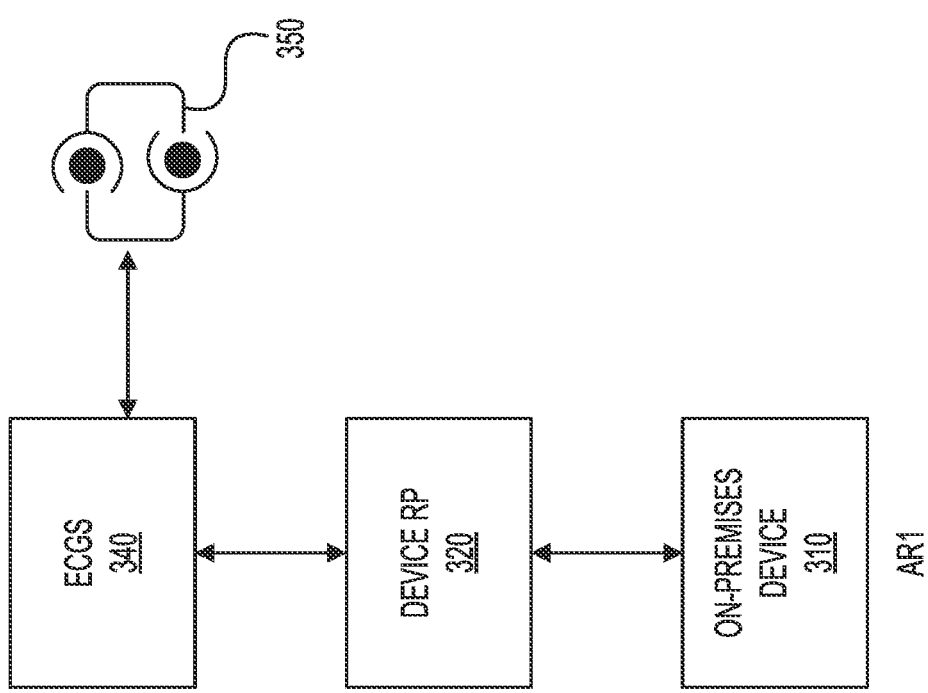

FIG. 3 shows two different arrangements (AR1 and AR2) for the provisioning of the device-specific hybrid connection endpoint resource. AR1 corresponds to an indirect flow and AR2 corresponds to a direct flow. As part of AR1, a device (e.g., on-premises device 310) makes a hybrid connection SAS request to its respective device RP service (e.g., device RP 320). Device RP 320, after authenticating the device, proxies the request to the gateway service (e.g., ECGS 340). The gateway service (e.g., ECGS 340), after authenticating the on-premises device (e.g., via a service-to-service token-based authorization), provisions a device-specific hybrid connection endpoint resource unique to the device (e.g., via a relay service 350) and returns the SAS to device RP 320. Finally, device RP 320 returns this SAS to the device (e.g., on-premises device 310), which uses it to connect with the relay and listen for incoming connections.

With continued reference to FIG. 3, AR2 corresponds to a direct flow. As part of AR2, a device (e.g., on-premises device 312) makes a hybrid connection SAS request to the gateway service (e.g., ECGS 342). The gateway service (e.g., ECGS 342) validates the authentication token associated with the SAS request and invokes its respective device RP service (e.g., device RP 322) to validate the authenticity of the device. The authentication mechanism may be the same authentication mechanism that is supported by the device RP. Next, the gateway service (e.g., ECGS 342) provisions a device-specific hybrid connection endpoint resource unique to the device (e.g., via a relay service 352) and returns the SAS to device RP 322. Finally, device RP 322 returns this SAS to the device (e.g., on-premises device 312), which uses it to connect with the relay and listen for the incoming connections.

Figure 4:
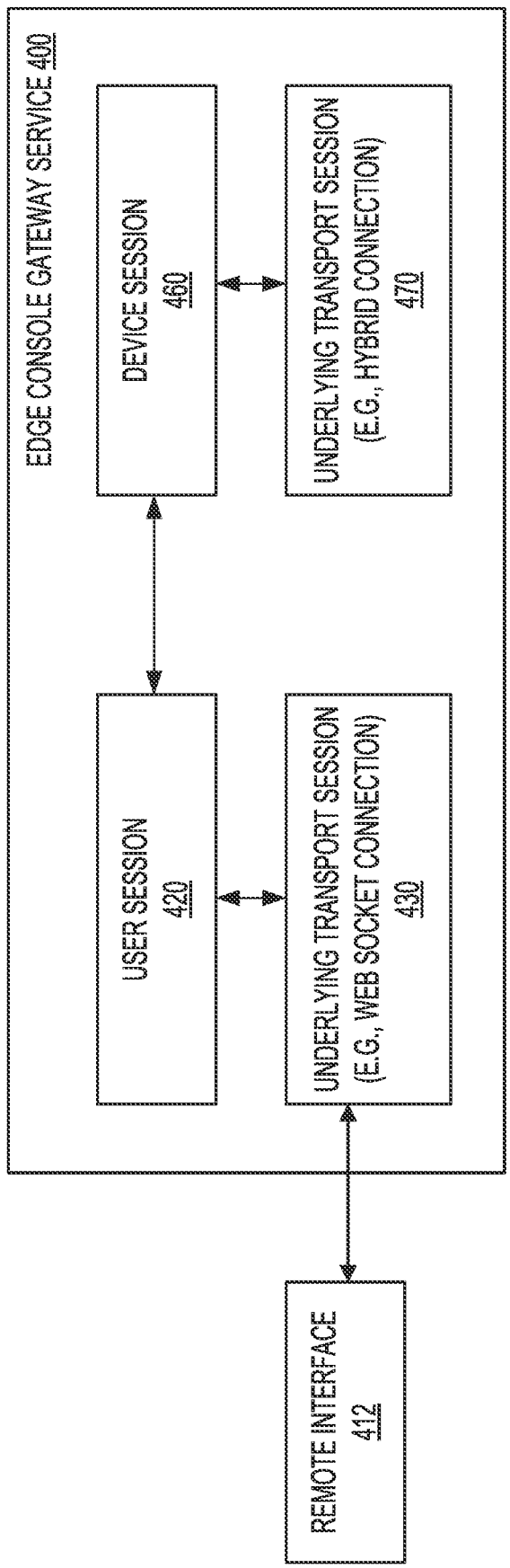
FIG. 4 shows one example of an edge console gateway service (ECGS) configured to provide interactive support services via a remote interface.

FIG. 4 shows one example of an edge console gateway service (ECGS) 400 configured to provide interactive support services via a remote interface 412 (e.g., remote interface 112 provided via terminal 110 or remote interface 122 provided via terminal 120 of FIG. 1). ECGS 400 creates a user session 420 representing a client side of the connection and a device session 460 representing the device side of the connection and binds them in a way that enables asynchronous communication between the two sides. ECGS 400 may accept incoming connections from the client side (e.g., users requiring support) via an underlying transport session 430 (e.g., a web socket connection). In addition, ECGS 400 may also prepare corresponding outgoing connections to the on-premises device via an underlying transport session 470 (e.g., a device-specific hybrid connection). In this manner, ECGS 400 may create a pipeline allowing for the exchange of messages between the two sides. In these examples, ECGS 400 provides several advantages with respect to support service in the system environment 100 described with respect to FIG. 1 and system 200 described with respect to FIG. 2. Although FIG. 4 shows ECGS 400 implemented in a certain way using a certain arrangement of components, ECGS 400 may be implemented in other ways.

Figure 5:
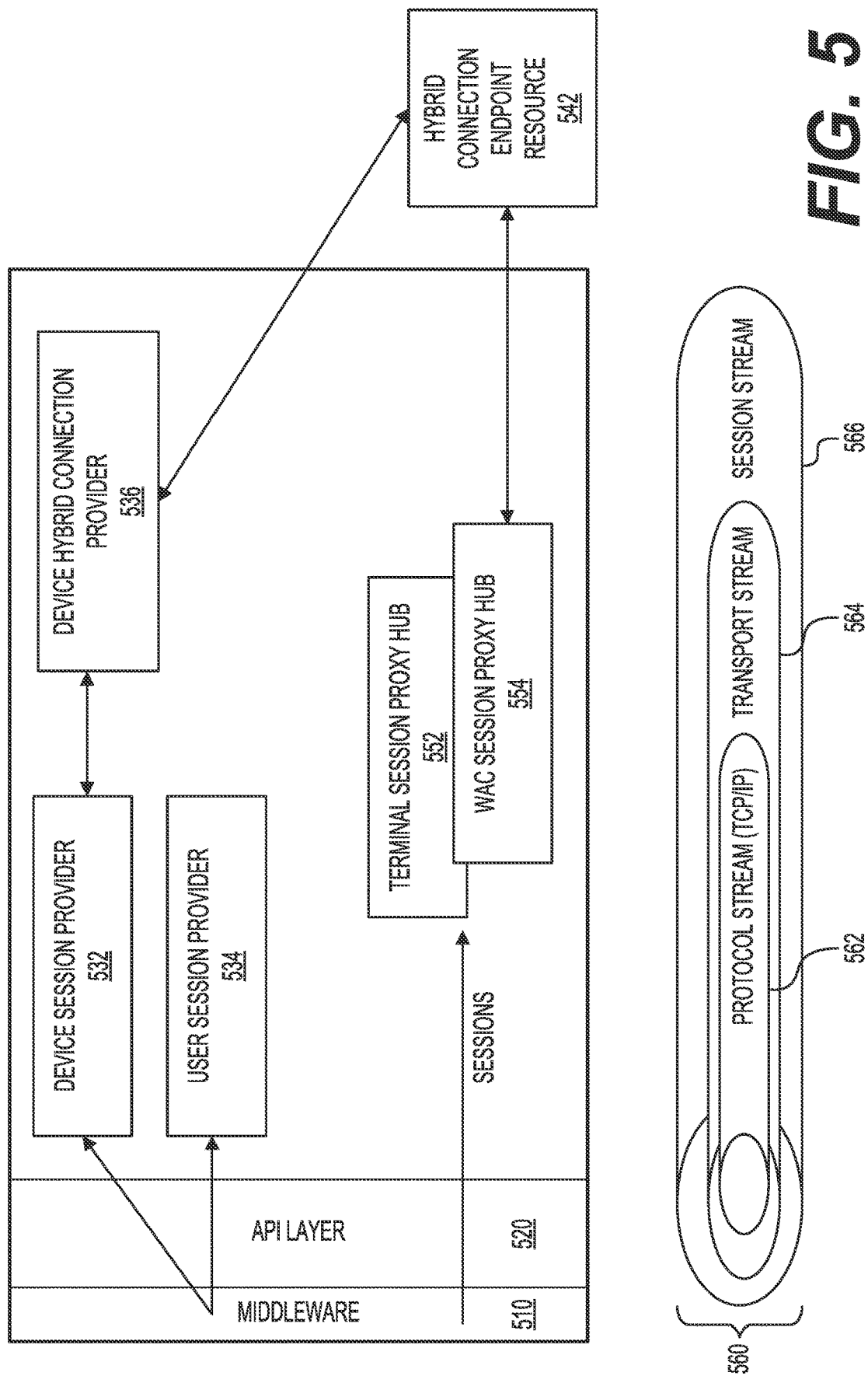
FIG. 5 shows example components for enabling session proxy flow.

FIG. 5 shows example components for enabling session proxy flow. In this example, the edge console gateway service is configured to accept both HTTP requests and Web socket requests on a single port (e.g., TCP/IP port 443). Middleware 510 is used to intercept a session request without requiring a reverse proxy. Application programming interface (API) layer 520 provides interfaces that support service agents and users can use to interact with the various components that enable the session proxy flow. Components for enabling the session proxy flow further include a device session provider 532, a user session provider 534, a device hybrid connection provider 536, a hybrid connection endpoint resource 542, a terminal session proxy hub 552, and a WAC session proxy hub 554. In addition, a set of streams 560, including a protocol stream 562 (e.g., TCP/IP), a transport stream 564, and a session stream 566 may be used to enable the movement of data and control information as part of the user session and the device session.

In this example, the user session represents the remote agent (e.g., a support service agent) that has requested access to the customer device (e.g., any of the on-premises devices described herein). The remote agent makes a connection request (HTTPS, WSS), e.g., via a browser, to connect to the customer device. The request specifies the target service being accessed (e.g., a PowerShell command shell or another application type) and a device identifier (e.g., the device can be identified using a globally unique identifier (GUID) or any other unique naming pattern). After the request is authenticated and authorized by a connectivity platform (e.g., the edge console gateway service described herein), user session provider 534 may help create a user session.

The device session represents the listening channel for incoming commands. Device session provider 532 may perform several steps before establishing the device session. In this example, as a first step, device session provider 532 validates if the device is legitimate/registered by looking it up in the service metadata store (e.g., service metadata store 242 of FIG. 2). Next, device session provider 532 checks if the device is accepting remote connections indicating active consent. As explained above, this consent is granted by an authorized user associated with the customer. After the consent is granted, device session provider 532 performs session setup to determine session capabilities with the device. Session setup may enable additional negotiated features on the channel such as data encryption, compression, and purpose of the session. The session setup may also give the flexibility of sending control commands, which are a curated set of well-known actions defined by the service that the agent on the device can implement. The session setup may be performed using a messaging format that allows negotiation with respect to the various aspects of the particular session, including capabilities allowed for a particular session.

Figure 6:
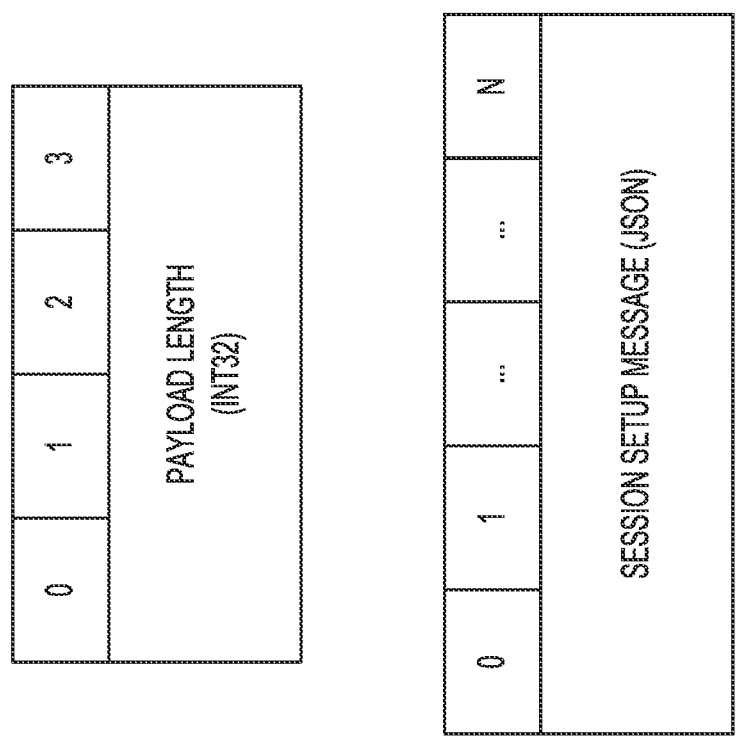
FIG. 6 shows an example format of a session setup message.

Each session setup message may include a payload length header and the message itself. In examples, the session setup messages each consist of a payload length header and the message itself. In one example, each setup message is formatted as serialized JavaScript Object Notation (JSON) of variable size. FIG. 6 shows an example format 600 of a session setup message. In this example, the session setup message includes a payload length header specifying a length of the payload and a data type associated with the payload. Format 600 shows the payload length header specifying the payload length as a 4-byte integer. Table 2 below shows one example of the session setup message itself formatted as serialized JSON.

TABLE 2

| Key | Type | Required |
|---|---|---|
| SessionID | 16-byte QUID | True |
| TrackingID | 16-byte GUID | False |
| SessionType | int representing a SessionType | True |
| TargetService | int representing a TargetService | True |
| MessageFormat | int representing a MessageFormat | True |
| Requirements | 4-byte bit vector of SessionRequirement flags | True |

In this example, sessionID specifies the GUID of the device that requires support and is a required field of the message. The session setup message may also include trackingID, which is not a required field. The trackingID may be used to enable auditing of the remote sessions. The trackingID may be used to enable diagnostics in this distributed system where a request may flow over multiple services (e.g., a request initiated from a browser to the connectivity platform and then on to the on-premises device). In this example, the agent service uses the trackingID for logging any events it emits while processing that specific session. As shown in Table 2, the session setup message may further include sessionType, which may be used to represent the type of device session (e.g., a control session or a data session) being established.

The session setup message may further include targetService, which may be used to represent the target service (e.g., PowerShell or WAC). As explained above, two types of remote interfaces may be supported by the session setup protocol: (1) a remote PowerShell session or (2) a remote WAC session. TargetService may be used to decide whether to forward data to a PowerShell Just Enough Administration (JEA) session (e.g., run the commands received via the pipeline) or to a remoting-enabled WAC gateway session. The session setup message may further include message-Format, which may be used to represent the format of the message. The format of the message relates to the semantics of how the message may be parsed or handled. In one example, the message may be formatted as raw data that is simply forwarded to the target service using TCP stream forwarding. In another example, the message may have a specified payload length in terms of byte (e.g., 4-byte length). In yet another example, the message may include JSON RPC protocol compliant data. The session setup message may further include requirements, which may be used to represent requirements that are specific to a particular session. In this example, requirements (a 4-byte bit vector) indicate which of the capabilities are required and must be used for a session. If either side does not support any of the required capabilities, then the session is terminated. Table 3, below, shows one example of the values associated with the requirements and their consequences.

TABLE 3

| Value | Meaning |
|---|---|
| Session_Message_Encrypt 0x0001 | When set, messages must be encrypted. |
| Session_Message_Compress 0x0002 | When set, messages must be compressed. |

In examples, a response to the session setup message is sent. When encryption is required, a symmetric session key (256 bytes) may be generated on the device side and sent back to the edge console gateway service in the session setup response. This session key may then be used to encrypt and decrypt data associated with the session. In one example, the symmetric encryption technique is the advanced encryption standard (AES) 256 bit encryption. Other types of encryption schemes, including asymmetric encryption techniques, may also be used. An initialization vector may also be sent along with the message to protect the message from tampering.

Table 4 below shows one example of a session setup response message.

TABLE 4

| Key | Type | Required |
|---|---|---|
| code | int representing an error code | True |
| message | string | True |

In Table 4, code (e.g., 4 bytes in length) corresponds to an integer representing an error code. The message variable contains the session key assuming the handshake via the message exchange was successful. In this example, to protect the session key from leaking, the device encrypts the key with a certificate public key. On the edge console gateway service side, that key is decrypted using a certificate private key. This certificate could be shipped on the device during deployment. In certain examples, the data and control information being exchanged are encrypted as part of using the HTTPs protocol. Such encrypted information, however, could be decrypted by HTTPs TLS inspection filters. The encryption set up via the session setup message is implemented such that even HTTPs TLS inspection filters may not be able to access the encrypted data and control information being exchanged as part of the remote session. This type of double encryption may make the remote session even more secure and less susceptible to eavesdropping or other attempts at accessing the data and the control information being transported.

Returning to FIG. 5, upon successful authentication and key exchange, device hybrid connection provider 536 provisions a device-specific hybrid connection endpoint resource (e.g., hybrid connection endpoint resource 542) unique to the device. Next, both the device session and the user session are delegated to a proxy hub component (e.g., one of terminal session proxy hub 552 or WAC session proxy hub 554). The proxy hub component manages the connections from this point onwards until the sessions are terminated.

In addition to the device session and the user session, the edge console gateway service may also allow for the setup of a control session. A control session allows control commands to be sent to the agent service on the on-premises device that establishes remote session with the service. Control commands may enable custom operations to be performed by the remote agent. These operations are not meant to be sent to the command shell (e.g., PowerShell) on the on-premises device. One example relates to the use of such control commands to enable the resizing of the terminal window(s). In case of a command shell running on the public cloud side, any terminal window may be resized using a call to a service that then handles the resizing of the command shell window. This functionality is possible because the command shell is running on the same accessible location as the service that handles the resizing. However, in the example hybrid connection scenarios applicable to the solutions described in this disclosure, the command shell is running on the device (not the service). Thus, as explained above, the user session initiated using a remote interface (e.g., a browser) does not directly have connectivity to the on-premises device because no inbound connections from the support service agents are allowed. To enable window resizing, the edge console gateway service components (e.g., the components described with respect to FIG. 5) that bind sessions from both ends and enable flow of such operations can be used to enable such control commands.

In one example, the control path is achieved via the same session setup protocol described above with respect to FIG. 5. Thus, when a connection is established between the user and the device, the service indicates the purpose of the session. As explained above, this type of information may be included in the setup message. As an example, sessionType property from Table 2 may be used to specify whether the session relates to control commands or data. Thus, in this example, sessionType property is 4-bytes in length and specifies one of the values shown in Table 5.

TABLE 5

| Value | Meaning |
| --- | --- |
| Control (1) | The session is intended for control path. Edge console gateway service (e.g., ECGS 140 of FIG. 1) uses this to send control commands to the agent service. As an example, the JSON RPC format may be used to send these commands. |
| Data (2) | This session is intended to proxy data to PowerShell. |

For a control session, the gateway service sets the control session flag, and the agent service (running on the on-premises device) will then use any data related to the session as a remote command for execution. In the case of the resizing of the terminal window, the corresponding command shell running on the device must be re-sized too, or the characters on the terminal would be garbled. In this example, any time the user or remote agent re-sizes the terminal window, the browser makes an API request to the gateway service with the new window dimensions. The service then establishes a new control session to the device, if needed (e.g., if one does not exist), and sends a resize command to the device via the control path. Because messages over the control path are handled by the agent service (rather than being forwarded to the command shell process), the agent service identifies the operation and executes it. In case of the resizing operation, the agent service resizes the command shell window. Table 6, below, outlines a method/command identifier for operations related to the control session.

TABLE 6

| Control Command | Description |
| --- | --- |
| $rpc.resizeConsoleHost | Resize the Console host (CONHOST) window associated with the remote interface (e.g., the window associated with the remote PowerShell session). |

Figure 7:
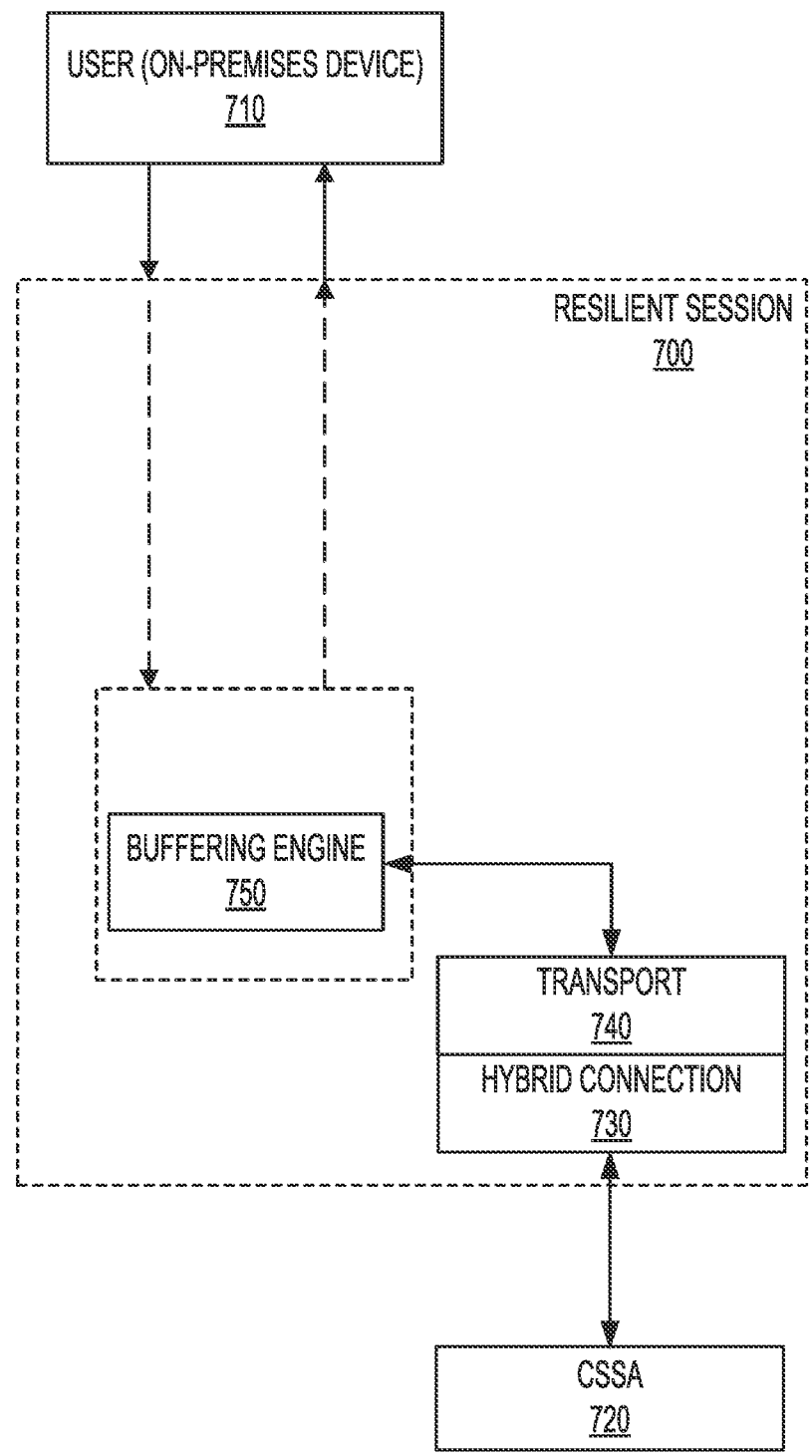
FIG. 7 shows an example of the buffering of the underlying transport stream to enable a resilient session in accordance with one example.

FIG. 7 shows an example of the buffering of the underlying transport stream to enable a resilient session 700. As explained above, problems with the underlying transport stream on the edge of a cloud can cause the session to terminate unexpectedly. As an example, a non-resilient session may cause enough disruption in terms of the transport of data and commands to result in termination (e.g., immediate termination) of any code (e.g., a script) run by a remote interface via PowerShell or the like. As shown in FIG. 7, a session between an authorized user (e.g., user (on-premises device) 710) associated with a customer and a support service agent (e.g., CSSA 720) may have the session supported not only by a hybrid connection 730 and a transport 740, but also a buffering engine 750. Buffering engine 750 may act as a transit place for data coming in and going out from the transport stream. If the transport stream faults, the resilient session will attempt to re-establish a new transport stream in the background while the incoming or outgoing data is buffered using buffering engine 750. Once a new stream has been established, the session may continue without interruption. In one example, resilient session 700 is implemented by the edge console gateway service described herein. In one example, a resilient session is implemented on both the service side (e.g., between hybrid connection endpoint resource 542 and one of terminal session proxy hub 552 or WAC session proxy hub 554) and the on-premises side (e.g., between the hybrid connection endpoint resource 542 and the on-premises device). Although FIG. 7 shows resilient session 700 implemented in a certain way using a certain arrangement of components, resilient session 700 may be implemented in other ways.

Figure 8:
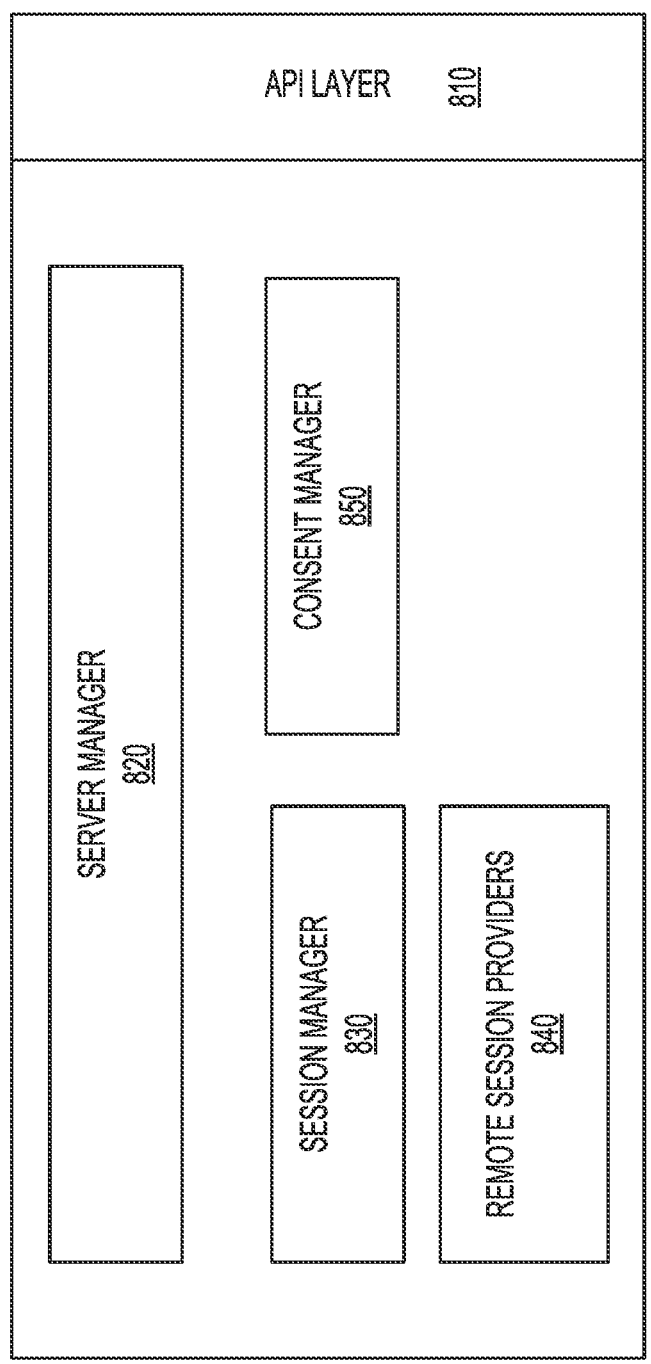
FIG. 8 shows an example implementation of an agent service.

FIG. 8 shows an example implementation of an agent service 800. In one example, agent service 800 is used to implement agent service 212 running on an on-premises device. In this example, agent service 800 includes an API layer 810, a server manager 820, a session manager 830, remote session providers 840, and a consent manager 850. API layer 810 may enable a user interface that users can use to interact with the agent service 800. User interface elements for enabling operations like granting consent and revoking consent may flow through API layer 810. Server manager 820 may act as the frontend controller for an instance of the agent service 800. Server manager 820 may accept connections from an authorized user associated with the customer and may perform session setup to establish a secure channel. Server manager 820 may also receive control commands that are targeted for agent service 800 and act as a frontend controller for the agent service 800. In this example, after a successful session setup, server manager 820 offloads the session management to session manager 830. Session manager 830 may connect a user session with the corresponding device session. As described herein, such connections may be facilitated by the edge console gateway service. Session manager 830 may rely upon remote session providers 840 to establish the user session and the device session, as described herein.

With continued reference to FIG. 8, remote session providers 840 may control the initialization and the startup of the remote interface command shell and the setting up of the appropriate streams that are needed to exchange data as part of a specific session. As explained above with respect to FIG. 5, remote session providers 840 may include a user session provider and a device session provider. The consent manager 850 may interact with various components to enable the granting and the revoking of the consent. In addition, consent manager 850 may ensure that the access granted in response to the consent being granted is limited to a curated set of actions that can be performed by the remote support service agent and/or limited to a specific period of time. In one example, to implement this feature, consent manager 850 processes the specified access level and the duration of the access. Example types of consent that may be provided are shown in Table 7 below.

TABLE 7

| Access Level | Description |
| --- | --- |
| Diagnostics | Enables service agent to perform diagnostic and/or troubleshooting related operations that do not change state. Such operations may include operations that allow the remote agent to obtain system state, capture network traces, or obtain system metadata. |
| DiagnosticsRepair | Enables service agent to perform diagnostic and repair related operations. Such operations may include operations that allow the remote agent to modify system state (e.g., start/stop resources) or restart virtual machines or other applications being run by an on-premises device. |

The level of consent may also include prohibited operations, such as operations that can change the user configuration associated with the on-premises device, obtain confidential data stored on the on-premises device, or alter the device's PowerShell JEA configuration. Agent service 800 may record the consent in a local store associated with the agent service. In one example, changing the access level of the consent does not terminate an existing session. In one example, changing the access level of the consent does not terminate an existing session but the changed access level is enforced on any future sessions. In one example, changing the access level of the consent terminates an existing session. Regardless, the revoking of the consent will terminate a session (e.g., immediately terminate the session). Although FIG. 8 shows agent service 800 implemented in a certain way using a certain arrangement of components, agent service 800 may be implemented in other ways.

Figure 9:
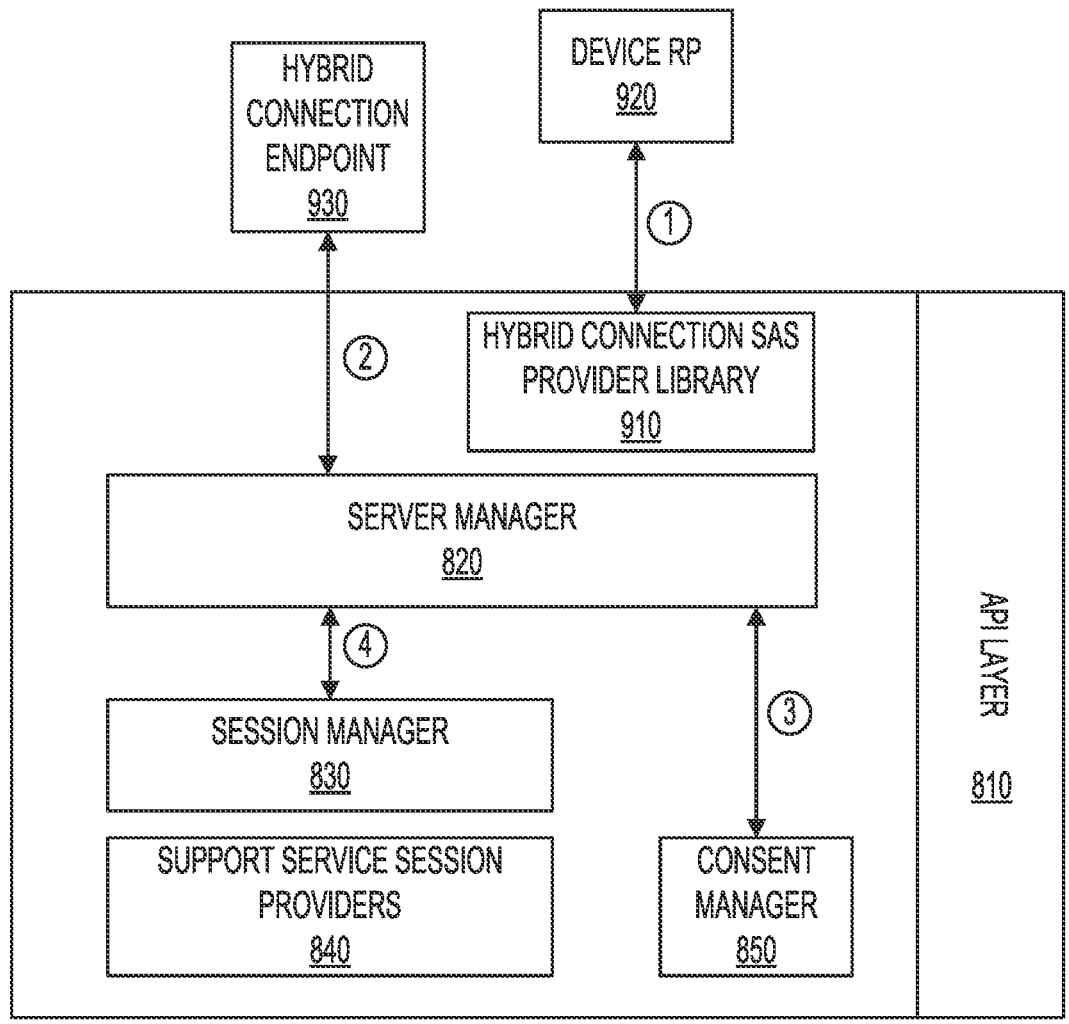
FIG. 9 shows an example implementation associated with a server manager.

FIG. 9 shows an example implementation 900 associated with a server manager (e.g., server manager 820 of FIG. 8). Server manager 820 may accept a connection request and perform session setup using a set of messages, as described herein. Upon receiving consent for the remote support (circled number 1), server manager 820 may start by retrieving a device specific hybrid connection SAS from its respective device RP (e.g., Device RP 920). The specific implementation of how the SAS is retrieved may be supplied by the on-premises device as part of a hybrid connection SAS provider library 910. Moreover, as explained above with respect to FIG. 3, this process may be accomplished via AR1 or AR2. In other examples, other types of authentication schemes are used. Next, server manager 820 may work with session manager 830 to connect to a hybrid connection endpoint (e.g., hybrid connection endpoint 930) (circled number 2) and start listening for connections initiated by a user requiring support. Server manager 820 may offload further processing to consent manager 850 (circled number 3) and session manager 830 (circled number 4). Although FIG. 9 shows implementation 900 using a certain arrangement of components, other implementations with a different arrangement of components may also be used.

Figure 10:
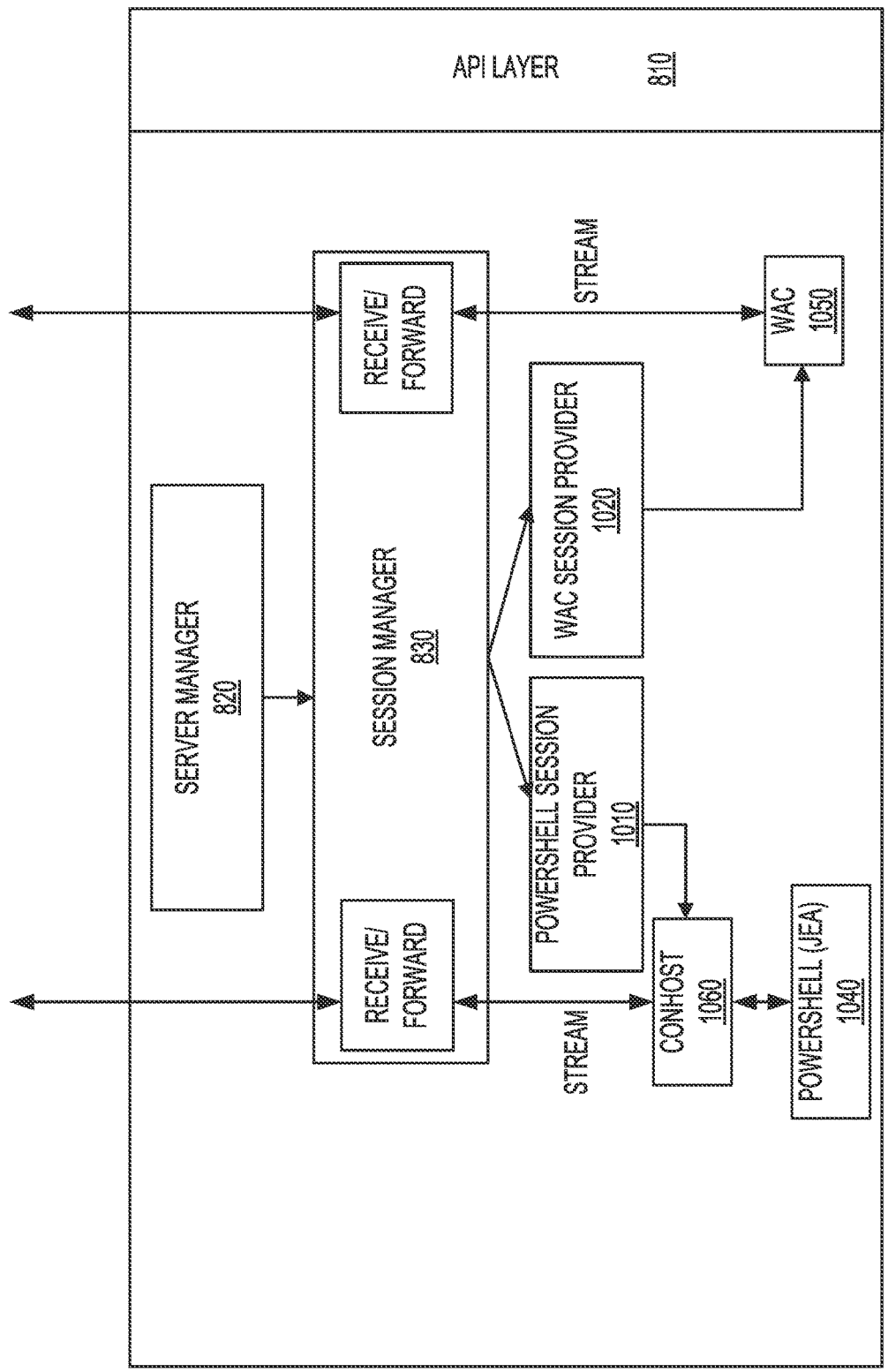
FIG. 10 shows an example implementation associated with a session manager.

FIG. 10 shows an example implementation 1000 associated with a session manager (e.g., session manager 830 of FIG. 8). Session manager 830 may bind or associate a user session with a device session. In this example, session manager 830 uses remote session providers (e.g., PowerShell session provider 1010 and WAC session provider 1020) to provision the specified session based on the access level granted. In this example, PowerShell session provider 1010 uses a JEA (PowerShell (JEA) 1040) feature to restrict this access. In addition, as explained above, in some implementations, the control session allows control commands to be sent to the agent on the on-premises device that establishes a remote session with the service. Control commands may enable custom operations to be performed by the agent. These custom operations are not sent to the command shell (e.g., PowerShell) on the on-premises device. One example relates to the use of such control commands for enabling the resizing of the terminal window(s), as discussed above. In this example, any time the remote support service agent resizes the terminal window, the browser makes an API request to the gateway service with the new window dimensions. The gateway service then establishes a new control session to the device (if one does not exist) and via this control path, sends a resize command down to the device. In the example described with respect to FIG. 10, the API request to gateway service may be handled by CONHOST 1060, which is then used to resize the window on the on-premises device.

With continued reference to FIG. 10, in one example, session manager 830 can handle multiple sessions in parallel to different endpoints (e.g., both a PowerShell connection and a WAC connection can be active at the same time, including a certain number of their instances). WAC session provider 1020 (e.g., implemented as a WAC gateway) may host a WAC endpoint (e.g., WAC 1050). Each session maintains a one-to-one mapping for a session between a specific user session and a specific device session. Although FIG. 10 shows implementation 1000 using a certain arrangement of components, other implementations with a different arrangement of components may also be used.

Figure 11:
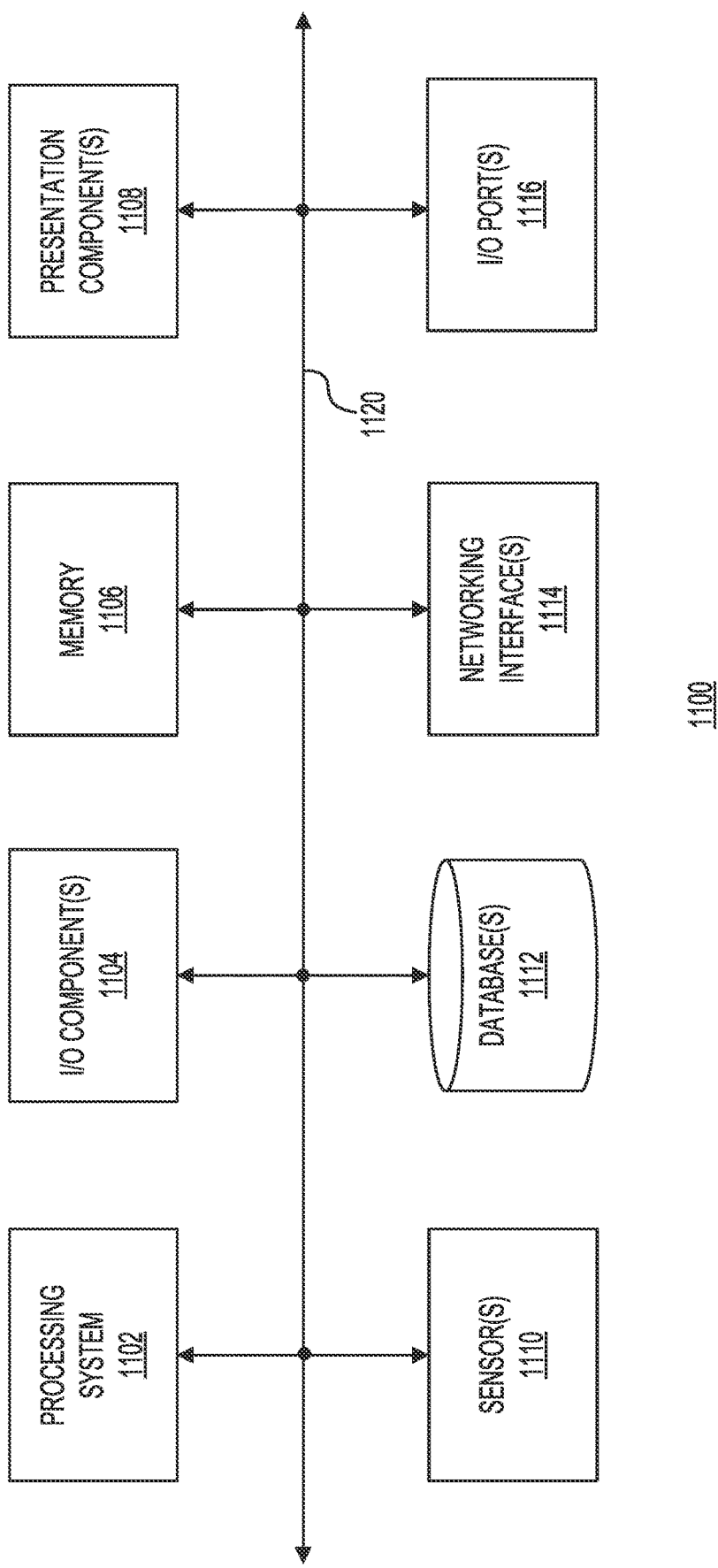
FIG. 11 is a block diagram of a computing system for performing methods associated with the present disclosure in accordance with one example.

FIG. 11 is a block diagram of a computing system 1100 for performing methods associated with the present disclosure in accordance with one example. Computing system 1100 may be a distributed computing system including components housed in data centers, on customers' premises, or any other location. As an example, computing system 1100 is used to implement the various parts of the components, services, terminals, and datastores described herein. Computing system 1100 includes a processing system 1102, I/O component(s) 1104, a memory 1106, presentation component(s) 1108, sensors 1110, database(s) 1112, networking interfaces 1114, and I/O port(s) 1116, which may be interconnected via bus 1120. The processing system 1102 may execute instructions stored in memory 1106 or any other instructions received via a wired or a wireless connection. The processing system 1102 may include CPUs, GPUs, Application-Specific Integrated Circuits (ASICs), Field-Programmable Gate Arrays (FPGAs), or other types of logic configured to execute instructions. I/O component(s) 1104 may include components such as a keyboard, a mouse, a voice recognition processor, or touch screens. Memory 1106 may be any combination of non-volatile storage or volatile storage (e.g., flash memory, DRAM, SRAM, or other types of memories). Presentation component(s) 1108 may include display(s), holographic device(s), or other presentation device(s). Display(s) may be any type of display, such as LCD, LED, or other types of display. Sensor(s) 1110 may include telemetry or other types of sensors configured to detect, and/or receive, information (e.g., conditions associated with the various devices in a data center). Sensor(s) 1110 may include sensors configured to sense conditions associated with CPUs, memory or other storage components, FPGAs, motherboards, baseboard management controllers, or the like. Sensor(s) 1110 may also include sensors configured to sense conditions associated with racks, chassis, fans, power supply units (PSUs), or the like. Sensor(s) 1110 may also include sensors configured to sense conditions associated with Network Interface Controllers (NICs), Top-of-Rack (TOR) switches, Middle-of-Rack (MOR) switches, routers, power distribution units (PDUs), rack level uninterrupted power supply (UPS) systems, or the like.

Still referring to FIG. 11, database(s) 1112 may be used to store any of the data or files (e.g., metadata store or other datasets) needed for the performance of the various methods and systems described herein. Database(s) 1112 may be implemented as a collection of distributed databases or as a single database. Network interface(s) 1114 may include communication interfaces, such as Ethernet, cellular radio, Bluetooth radio, UWB radio, or other types of wireless or wired communication interfaces. I/O port(s) 1116 may include Ethernet ports, Fiber-optic ports, wireless ports, or other communication ports.

Instructions for enabling various systems, components, devices, methods, services, and terminals may be stored in memory 1106 or another memory. These instructions when executed by processing system 1102, or other processors, may provide the functionality associated with the various systems, components, devices, services, terminals, and methods described in this disclosure. The instructions could be encoded as hardware corresponding to a processor or a field programmable gate array. Other types of hardware such as ASICs and GPUs may also be used. The functionality associated with the systems, services, devices, components, methods, and terminals described herein may be implemented using any appropriate combination of hardware, software, or firmware. Although FIG. 11 shows computing system 1100 as including a certain number of components arranged and coupled in a certain way, it may include fewer or additional components arranged and coupled differently. In addition, the functionality associated with computing system 1100 may be distributed or combined, as needed.

Figure 12:
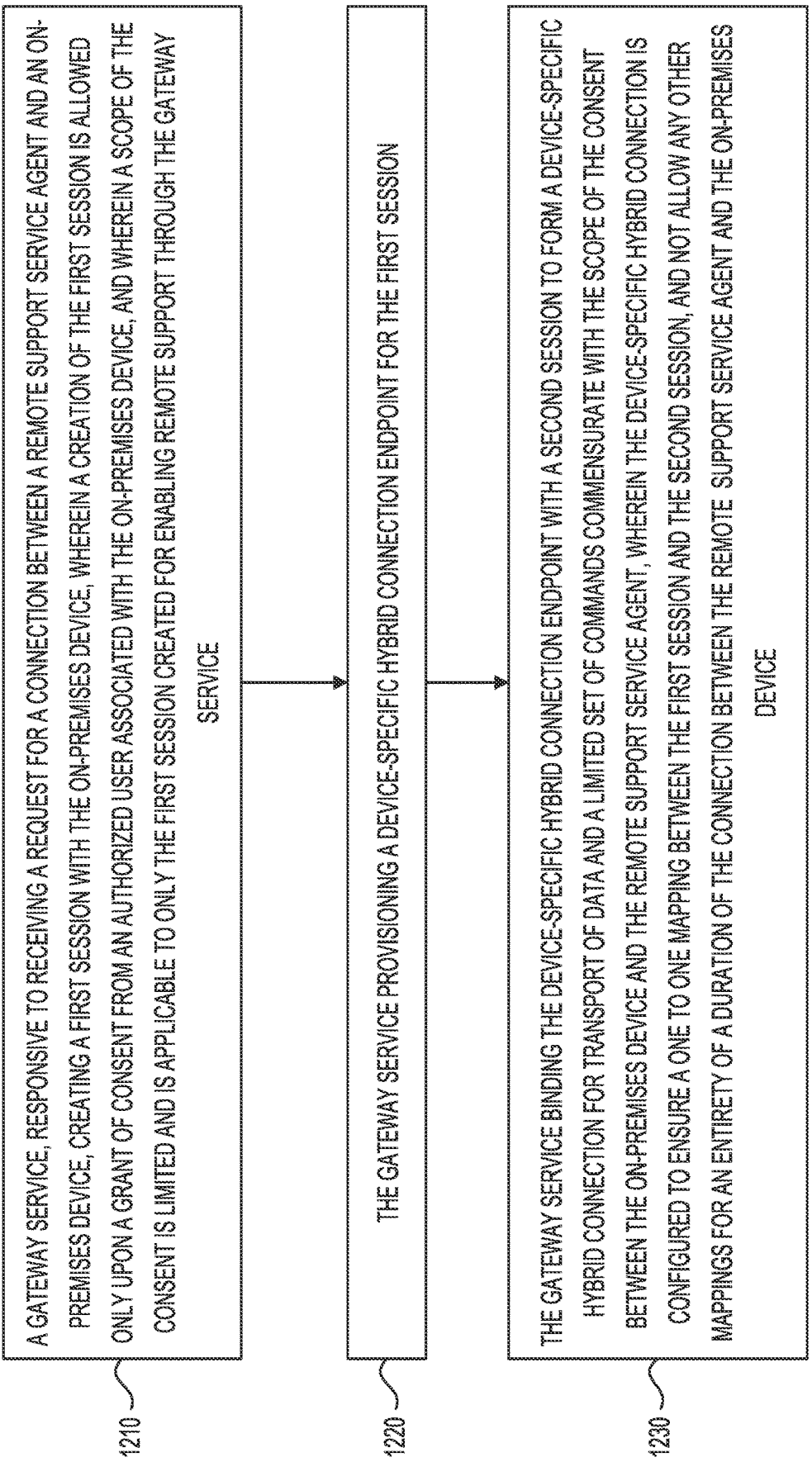
FIG. 12 shows a flowchart of a method for enabling support for an on-premises device via a gateway service in accordance with one example.

FIG. 12 shows a flowchart 1200 of a method for enabling support for an on-premises device via a gateway service in accordance with one example. In this example, the method is performed by the instructions and the components associated with the gateway service described above. Instructions associated with the gateway service may be stored in memory 1106 or another memory and executed by the processing system 1102 of FIG. 11 or another processor. Step 1210 may include the gateway service, responsive to receiving a request for a connection between a remote support service agent and an on-premises device, creating a first session with the on-premises device, where a creation of the first session is allowed only upon a grant of consent from an authorized user associated with the on-premises device, and where a scope of the consent is limited and is applicable to only the first session created for enabling remote support through the gateway service.

Step 1220 may include the gateway service provisioning a device-specific hybrid connection endpoint for the first session.

Step 1230 may include the gateway service binding the device-specific hybrid connection endpoint with a second session to form a device-specific hybrid connection for transport of data and a limited set of commands commensurate with the scope of the consent between the on-premises device and the remote support service agent, where the device-specific hybrid connection is configured to ensure a one to one mapping between the first session and the second session, and not allow any other mappings for an entirety of a duration of the connection between the remote support service agent and the on-premises device.

Figure 13:
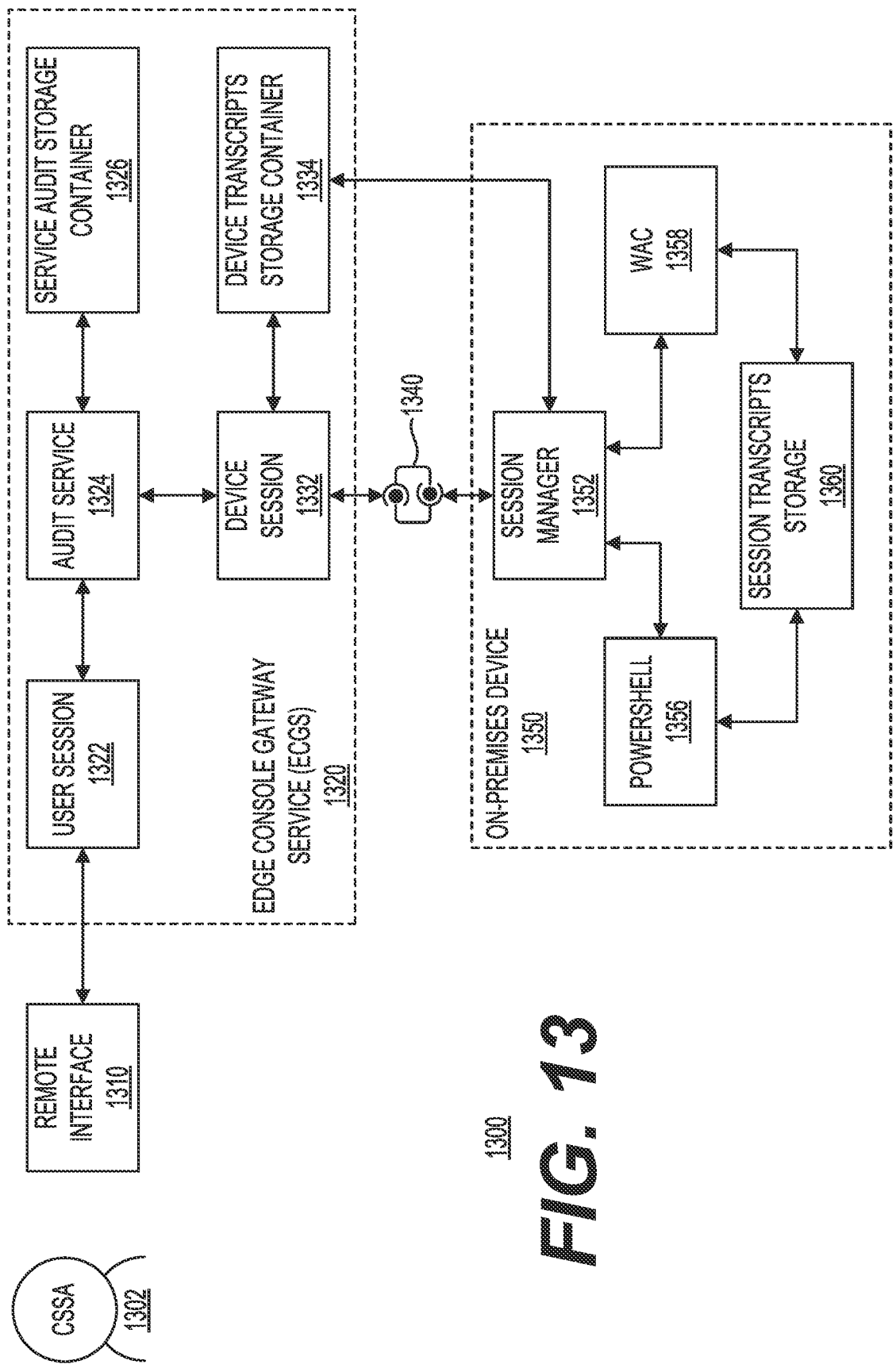
FIG. 13 shows an example implementation for auditing of a resilient and interactive command access to on-premises devices in a hybrid cloud.

FIG. 13 shows an example of an implementation 1300 associated with auditing of a resilient and interactive command access to on-premises devices in a hybrid cloud. As described above, an ECGS 1320 (similar to ECGS 400 of FIG. 4) may be configured to provide interactive support services such that a support service agent (CSSA) 1302 may access an on-premises device 1350 via a remote interface 1310 (e.g., similar to remote interface 112 provided via terminal 110 or remote interface 122 provided via terminal 120 of FIG. 1). ECGS 1320 may create a user session 1322 representing a client side of the connection and a device session 1332 representing the device side of the connection and bind them to enable asynchronous communication between the two sides (as explained above). In this manner, ECGS 1320 may create a pipeline allowing for the exchange of messages between the two sides. In this example, implementation 1300 is structured to provide auditing of the resilient and interactive command access to on-premises devices at two levels. The first level relates to the auditing of activities related to the interactions via ECGS 1320 between the support service agent and the on-premises device and its user. The second level relates to the auditing of operations performed on the on-premises device by at least the support service agent. This multi-level auditing functionality allows for greater transparency into activities associated with the remote support. As an example, audit service 1324 associated with ECGS 1320 automatically generates audit events (e.g., each API call to ECGS 1320) along with the unique device identifier (e.g., the trackingID described above with respect to Table 2 for each API call), automatically creates records related to the audit events, and automatically stores the records in a service audit storage container 1326. ECGS 1320 also includes instructions, or other functionality, to enable retrieval and storage of the remote session transcript in a device transcripts storage container 1334. In one example, device transcripts storage container 1334 stores one or more transcripts corresponding to an on-premises device identifiable by a unique identifier (e.g., the trackingID described above with respect to Table 2).

With continued reference to FIG. 13, a session manager 1352 (e.g., similar to session manager 830 of FIG. 8) may bind or associate a user session with a device session. In this example, session manager 1352 relies upon PowerShell 1356 (e.g., PowerShell (JEA) 1040) described above with respect to PowerShell session provider 1010 of FIG. 10) to facilitate the auditing of a remote session at on-premises device 1350. Using a transcripts feature associated with PowerShell 1356, session manager 1352 may automatically store complete session details, including any commands executed and outputs generated during the session at on-premises device 1350, as part of session transcripts storage 1360. In an alternative implementation, a transcripts feature associated with WAC 1358 (described above with respect to the WAC session provider 1020 of FIG. 10) is used to store complete session details, including any commands executed and outputs generated during the session at on-premises device 1350, as part of session transcripts storage 1360. The session details may also include information, such as the start and/or end time of the access to on-premises device.

Still referring to FIG. 13, in this example, as part of a tear down sequence, session manager 1352 may request the SAS key (described above) for device transcripts storage container 1334 from ECGS 1320, and then may upload the session transcript for storage as part of device transcripts storage container 1334. In one example, ECGS 1320 specifies an audit retention period, upon expiration of the audit retention period, any transcripts stored as part of the auditing process may be deleted. The instructions associated with the two-level auditing described herein may be performed using the processing system 1102 of FIG. 11 or other processors. Although FIG. 13 shows implementation 1300 using a certain arrangement of components, other implementations with a different arrangement of components may also be used.

Figure 14:
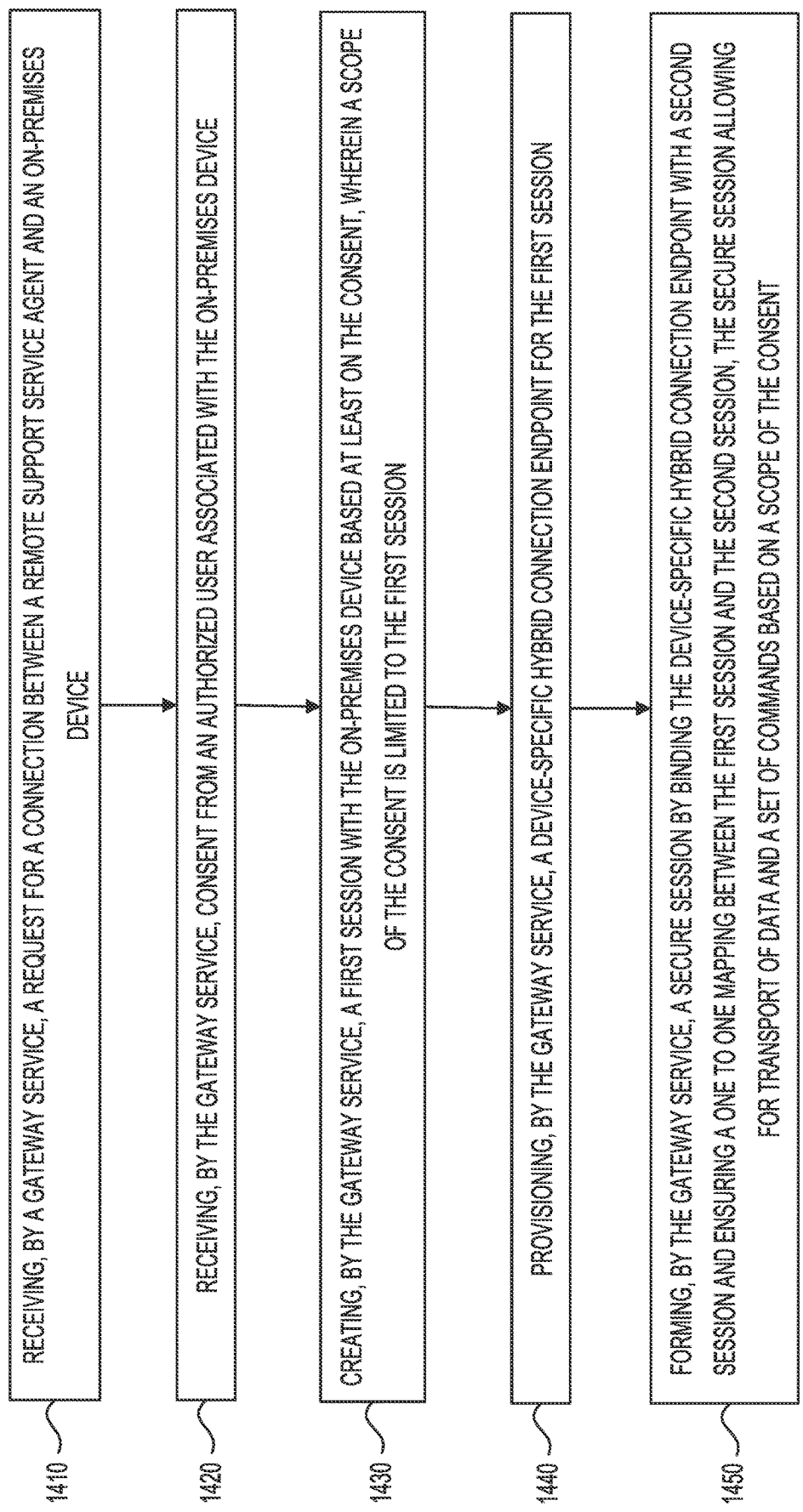
FIG. 14 shows a flowchart of another method for enabling support for an on-premises device via a gateway service in accordance with one example.

FIG. 14 shows a flowchart 1400 of a method for enabling support for an on-premises device via a gateway service in accordance with one example. In this example, the method is performed by the instructions and the components associated with the gateway service described above. Instructions associated with the gateway service may be stored in memory 1106 or another memory and executed by the processing system 1102 of FIG. 11 or another processor. Step 1410 includes receiving, by a gateway service (e.g., ECGS 140 of FIG. 1), a request for a connection between a remote support service agent and an on-premises device. Step 1420 includes receiving, by the gateway service, consent from an authorized user associated with the on-premises device. Step 1430 includes creating, by the gateway service, a first session with the on-premises device based at least on the consent, where a scope of the consent is limited to the first session. The first session may correspond to the user session described above.

Step 1440 includes provisioning, by the gateway service, a device-specific hybrid connection endpoint for the first session. Step 1450 includes forming, by the gateway service, a secure session by binding the device-specific hybrid connection endpoint with a second session, the secure session allowing for transport of data and a set of commands based on a scope of the consent. The second session may correspond to the device session described above.

The present disclosure relates to a method including receiving, by a gateway service, a request for a connection between a remote support service agent and an on-premises device. The method further includes receiving, by the gateway service, consent from an authorized user associated with the on-premises device. The method further includes creating, by the gateway service, a first session with the on-premises device, where a scope of the consent is limited to the first session.

The method further includes provisioning, by the gateway service, a device-specific hybrid connection endpoint for the first session. The method further includes forming, by the gateway service a secure session by binding the device-specific hybrid connection endpoint with a second session, the secure session allowing for transport of data and a set of commands based on a scope of the consent.

As part of this method, the first session comprises a device session between an agent service associated with the on-premises device and the device-specific hybrid connection endpoint. The second session comprises a user session initiated between a remote interface associated with the remote support service agent and the device-specific hybrid connection endpoint.

The gateway service may be enabled by a cloud service provider and the on-premises device is part of an on-premises cloud portion coupled to a public cloud portion managed by the cloud service provider. The method further comprises enabling automatic generation and storage of transcripts for: (1) auditing of interactions between the support service agent and the on-premises device through the gateway service, and (2) auditing of operations or commands performed on the on-premises device by the support service agent.

The method further comprises buffering a transport stream comprising the data and the set of commands. The method further comprises performing session setup for the first session, the session setup including determining session capabilities of the on-premises device and enabling features specified in a session setup message. Any of the steps summarized above could be performed in any combination and in any order to address one or more of the problems posed by any of the issues such as: (1) network-related issues, (2) access-related issues, or (3) security-related issues described above.

In another aspect, the present disclosure relates to a gateway service for enabling remote access to an on-premises device. The gateway service may comprise instructions that, when executed by a processing system, perform operations including receive a request for a connection between a remote support service agent and the on-premises device requiring support, receive consent from an authorized user associated with the on-premises device, and create a first session with the on-premises device, where a scope of the consent is limited to the first session.

The operations further include provision a device-specific hybrid connection endpoint for the first session and form a secure session by binding the device-specific hybrid connection endpoint with a second session and ensuring a one to one mapping between the first session and the second session, the secure session allowing for transport of data and a set of commands based on the scope of the consent.

As part of the gateway service, the first session comprises a device session between an agent service associated with the on-premises device and the device-specific hybrid connection endpoint. The second session comprises a user session initiated between a remote interface associated with the remote support service agent and the device-specific hybrid connection endpoint.

As part of the gateway service, the operations further comprise buffer a transport stream comprising the data and the set of commands. The operations further comprise enable encryption of the data and the set of commands such that an encrypted version of the data and the set of commands is not accessible as clear text to hypertext transport protocol layer inspection filters. The operations further comprise enable performance of a resizing operation associated with a window displayed on the on-premises device by binding the device-specific hybrid connection endpoint with a control session.

The operations further comprise perform session setup for the first session, the session setup including determining session capabilities of the on-premises device and enabling features specified in a session setup message. Any of the system components summarized above could be combined, or distributed, in any manner to address one or more of the problems posed by any of the issues such as: (1) network-related issues, (2) access-related issues, or (3) security-related issues described above.

In yet another aspect, the present disclosure relates to a method including a receiving, by a gateway service, a request for a connection between a remote support service agent and an on-premises device, where the remote support service agent does not have permission to create direct inbound connections to the on-premises device. The method further includes receiving, by the gateway service, consent from an authorized user associated with the on-premises device and creating, by the gateway service, a first session with the on-premises device based at least on the consent, where a scope of the consent is limited to the first session.

The method further includes provisioning, by the gateway service, a device-specific hybrid connection endpoint for the first session and forming, by the gateway service, a secure session by binding the device-specific hybrid connection endpoint with a second session and ensuring a one to one mapping between the first session and the second session, the secure session allowing for transport of data and a set of commands based on a scope of the consent.

As part of the method, the first session comprises a device session between an agent service associated with the on-premises device and the device-specific hybrid connection endpoint. The second session comprises a user session initiated between a remote interface associated with the remote service support agent and the device-specific hybrid connection endpoint. The gateway service is enabled by a cloud service provider and where the on-premises device is part of an on-premises cloud portion coupled to a public cloud portion managed by the cloud service provider.

The method further includes, using a control session enabled by the device-specific hybrid connection endpoint, performing a resizing operation associated with a window displayed on the on-premises device. The method further includes buffering a transport stream comprising the data and the set of commands. Any of the steps summarized above could be performed in any combination and in any order to address one or more of the problems posed by any of the issues such as: (1) network-related issues, (2) access-related issues, or (3) security-related issues described above.

It is to be understood that the systems, services, devices, methods, terminals, and components described herein are merely examples. Alternatively, or in addition, the functionality described herein can be performed, at least in part, by one or more hardware logic components. For example, illustrative types of hardware logic components that can be used include FPGAs, ASICs, Application-Specific Standard Products (ASSPs), System-on-a-Chip systems (SOCs), Complex Programmable Logic Devices (CPLDs). In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a device, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Exemplary transmission media, include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method comprising:
receiving, by a gateway service, a request for a connection between a remote support service agent and an on-premises device experiencing a disruption caused by software or hardware;
receiving, by the gateway service, consent from an authorized user associated with the on-premises device;
granting, by the gateway service and based on the consent, the remote support service agent access to the on-premises device during a device session that lasts a predetermined time period, wherein the access is limited to a set of commands for executing a diagnostic or repair operation associated with the disruption caused by the software or the hardware;
creating, by the gateway service, the device session with the on-premises device;
provisioning, by the gateway service, a device-specific hybrid connection endpoint for the device session; and
forming, by the gateway service, a secure session by binding the device-specific hybrid connection endpoint with a user session, wherein the binding establishes a one-to-one mapping between the device session and the user session ensuring that the user session is based on the set of commands for executing the diagnostic or repair operation associated with the disruption caused by the software or the hardware.

2. The method of claim 1, wherein the device session is between an agent service associated with the on-premises device and the device-specific hybrid connection endpoint.

3. The method of claim 2, wherein the user session is between a remote interface associated with the remote support service agent and the device-specific hybrid connection endpoint.

4. The method of claim 1, wherein the gateway service is enabled by a cloud service provider and wherein the on-premises device is part of an on-premises cloud portion coupled to a public cloud portion managed by the cloud service provider.

5. The method of claim 1, further comprising enabling automatic generation and storage of transcripts for (1) auditing of interactions between the remote support service agent and the on-premises device through the gateway service, and (2) auditing the set of commands for executing the diagnostic or repair operation associated with the disruption caused by the software or the hardware.

6. The method of claim 1, further comprising buffering a transport stream comprising the set of commands.

7. The method of claim 1, further comprising performing session setup for the device session, the session setup including determining session capabilities of the on-premises device and enabling features specified in a session setup message.

8. A gateway service for enabling remote access to an on-premises device, the gateway service comprising instructions that, when executed by a processing system, perform operations comprising:
receiving a request for a connection between a remote support service agent and the on-premises device experiencing a disruption caused by software or hardware;
receiving consent from an authorized user associated with the on-premises device;
granting, based on the consent, the remote support service agent access to the on-premises device during a device session that lasts a predetermined time period, wherein the access is limited to a set of commands for executing a diagnostic or repair operation associated with the disruption caused by the software or the hardware;
creating the device session with the on-premises device;
provisioning a device-specific hybrid connection endpoint for the device session; and
forming a secure session by binding the device-specific hybrid connection endpoint with a user session, wherein the binding establishes a one-to-one mapping between the device session and the user session ensuring that the user session is based on the set of commands for executing the diagnostic or repair operation associated with the disruption caused by the software or the hardware.

9. The gateway service of claim 8, wherein the device session is between an agent service associated with the on-premises device and the device-specific hybrid connection endpoint.

10. The gateway service of claim 9, wherein the user session is between a remote interface associated with the remote support service agent and the device-specific hybrid connection endpoint.

11. The gateway service of claim 8, wherein the operations further comprise buffering a transport stream comprising the set of commands.

12. The gateway service of claim 8, wherein the operations further comprise enabling encryption of the set of commands such that an encrypted version of the set of commands is not accessible as clear text to hypertext transport protocol layer inspection filters.

13. The gateway service of claim 8, wherein the operations further comprise enabling performance of a resizing operation associated with a window displayed on the on-premises device by binding the device-specific hybrid connection endpoint with a control session.

14. The gateway service of claim 8, wherein the operations further comprise performing session setup for the device session, the session setup including determining session capabilities of the on-premises device and enabling features specified in a session setup message.

15. A method comprising:
receiving, by a gateway service, a request for a connection between a remote support service agent and an on-premises device experiencing a disruption caused by software or hardware, wherein the remote support service agent does not have permission to create direct inbound connections to the on-premises device;
receiving, by the gateway service, consent from an authorized user associated with the on-premises device;
granting, by the gateway service and based on the consent, the remote support service agent access to the on-premises device during a device session that lasts a predetermined time period, wherein the access is limited to a set of commands for executing a diagnostic or repair operation associated with the disruption caused by the software or the hardware;
creating, by the gateway service, the device session with the on-premises device;
provisioning, by the gateway service, a device-specific hybrid connection endpoint for the device session; and
forming, by the gateway service, a secure session by binding the device-specific hybrid connection endpoint with a user session, wherein the binding establishes a one-to-one mapping between the device session and the user session ensuring that the user session is based on the set of commands for executing the diagnostic or repair operation associated with the disruption caused by the software or the hardware.

16. The method of claim 15, wherein the device session is between an agent service associated with the on-premises device and the device-specific hybrid connection endpoint.

17. The method of claim 16, wherein the user session is between a remote interface associated with the remote service support agent and the device-specific hybrid connection endpoint.

18. The method of claim 17, wherein the gateway service is enabled by a cloud service provider and wherein the on-premises device is part of an on-premises cloud portion coupled to a public cloud portion managed by the cloud service provider.

19. The method of claim 18, further comprising, using a control session enabled by the device-specific hybrid connection endpoint, performing a resizing operation associated with a window displayed on the on-premises device.

20. The method of claim 18, further comprising buffering a transport stream comprising the set of commands.

\* \* \* \* \*